(12) United States Patent
Buchanan

(10) Patent No.: US 9,140,317 B2
(45) Date of Patent: Sep. 22, 2015

(54) WRENCH RATCHET MECHANISMS AND WRENCHES

(76) Inventor: Nigel A. Buchanan, Fife (GB)

( * ) Notice: Subject to any disclaimer, the term of this patent is extended or adjusted under 35 U.S.C. 154(b) by 0 days.

(21) Appl. No.: 13/819,755

(22) PCT Filed: Aug. 30, 2011

(86) PCT No.: PCT/GB2011/051624
§ 371 (c)(1),
(2), (4) Date: Sep. 11, 2013

(87) PCT Pub. No.: WO2012/028870
PCT Pub. Date: Mar. 8, 2012

(65) Prior Publication Data
US 2013/0341147 A1 Dec. 26, 2013

(30) Foreign Application Priority Data

Aug. 30, 2010 (EP) .................................. 10174563

(51) Int. Cl.
*F16D 11/06* (2006.01)
*F16D 41/063* (2006.01)
*B25B 13/46* (2006.01)

(52) U.S. Cl.
CPC ............ *F16D 41/063* (2013.01); *B25B 13/461* (2013.01); *B25B 13/462* (2013.01); *B25B 13/463* (2013.01); *B25B 13/465* (2013.01)

(58) Field of Classification Search
CPC ... F16D 41/063; B25B 13/462; B25B 13/465; B25B 13/461; B25B 13/463
USPC ....... 192/43, 41 R, 43.1, 43.2, 45.1, 45.2, 47, 192/41 S, 41 A
See application file for complete search history.

(56) References Cited

U.S. PATENT DOCUMENTS

| 4,299,145 A | 11/1981 | Rautio et al. |
| 4,419,026 A | 12/1983 | Leto |
| 5,070,978 A | 12/1991 | Pires |
| 5,178,047 A | 1/1993 | Arnold et al. |

(Continued)

FOREIGN PATENT DOCUMENTS

| DE | 710060 | 9/1941 |
| DE | 3818470 | 3/1989 |

(Continued)

OTHER PUBLICATIONS

International Search Report dated Jan. 24, 2012 for corresponding PCT Application No. PCT/GB2011/051624.

(Continued)

*Primary Examiner* — David J Hlavka
(74) *Attorney, Agent, or Firm* — Gardner, Linn, Burkhart & Flory, LLP

(57) ABSTRACT

A wrench ratchet mechanism includes a driven member, a housing defining a chamber in which the driven member is at least partially received, a plurality of drive transmitting members disposed in respective recesses between the driven member and housing to transmit a drive force between the housing and driven member and a force applying member extending at least partially around the driven member. The force applying member is movable in a circumferential direction thereof to apply a circumferentially directed force to the drive transmitting members to move the drive transmitting members in the recesses from a non-drive transmitting position towards a drive transmitting position.

28 Claims, 11 Drawing Sheets

(56) References Cited

U.S. PATENT DOCUMENTS

| | | | |
|---|---|---|---|
| 5,315,902 A | 5/1994 | Ragland et al. | |
| 5,467,672 A | 11/1995 | Ashby | |
| 5,501,124 A | 3/1996 | Ashby | |
| 5,690,202 A | 11/1997 | Myers | |
| 5,699,889 A | 12/1997 | Gadd | |
| 5,709,137 A | 1/1998 | Blacklock | |
| 5,713,251 A | 2/1998 | Zurbuchen et al. | |
| 5,782,147 A | 7/1998 | Chaconas et al. | |
| 5,794,496 A | 8/1998 | Arnold | |
| 5,878,635 A | 3/1999 | Hsieh | |
| 5,937,981 A | 8/1999 | Adams et al. | |
| 5,983,757 A | 11/1999 | Blise et al. | |
| 5,996,453 A | 12/1999 | Blacklock | |
| 6,109,410 A | 8/2000 | Costin | |
| 6,142,277 A | 11/2000 | Barnett et al. | |
| 6,148,979 A | 11/2000 | Roach et al. | |
| 6,151,993 A | 11/2000 | Shiao | |
| 6,253,646 B1 * | 7/2001 | Chang | 81/59.1 |
| 6,357,323 B2 | 3/2002 | Chi et al. | |
| 6,367,354 B1 | 4/2002 | Mitchell | |
| 6,499,380 B1 | 12/2002 | Hsiao | |
| 6,505,721 B1 | 1/2003 | Welch | |
| 6,530,296 B1 | 3/2003 | Liao | |
| 6,533,089 B2 | 3/2003 | Muramatsu | |
| 6,575,058 B1 | 6/2003 | Mitchell | |
| 6,615,693 B1 | 9/2003 | Liao | |
| 6,666,112 B2 | 12/2003 | Hu | |
| 6,691,848 B1 | 2/2004 | Eyraud et al. | |
| 6,732,614 B2 | 5/2004 | Hu | |
| 6,769,330 B2 | 8/2004 | Chang | |
| 6,851,334 B2 | 2/2005 | Hsien | |
| 6,915,723 B2 | 7/2005 | Hsieh | |
| 6,918,323 B2 | 7/2005 | Arnold et al. | |
| 7,044,029 B1 | 5/2006 | Hopper, Jr. et al. | |
| 7,051,623 B2 | 5/2006 | Chaconas | |
| 7,124,664 B1 * | 10/2006 | Lee | 81/63.1 |
| 7,137,320 B2 | 11/2006 | Tuan-Mu | |
| 7,146,881 B2 | 12/2006 | Chang | |
| 7,197,964 B2 | 4/2007 | Buchanan | |
| 7,222,557 B2 | 5/2007 | Li et al. | |
| 7,299,720 B1 | 11/2007 | Schultz et al. | |
| 7,444,902 B1 * | 11/2008 | Lin et al. | 81/57.29 |
| 7,536,934 B1 | 5/2009 | Tatangelo | |
| 7,987,747 B2 | 8/2011 | Ross et al. | |
| 8,261,636 B2 * | 9/2012 | Lin | 81/63.1 |
| 2001/0003933 A1 * | 6/2001 | Chi et al. | 81/60 |
| 2004/0247413 A1 | 12/2004 | Ha | |
| 2008/0229889 A1 | 9/2008 | Hopper et al. | |
| 2009/0314139 A1 * | 12/2009 | Hu | 81/63.1 |
| 2010/0050820 A1 | 3/2010 | Coronado et al. | |
| 2010/0212461 A1 | 8/2010 | Burt | |
| 2013/0340574 A1 | 12/2013 | Buchanan | |

FOREIGN PATENT DOCUMENTS

| | | |
|---|---|---|
| DE | 9208014 | 7/1992 |
| DE | 9321204 | 7/1996 |
| DE | 20200363 | 4/2002 |
| DE | 202009013747 | 3/2010 |
| GB | 648163 | 12/1950 |
| GB | 2250463 | 6/1992 |

OTHER PUBLICATIONS

Written Opinion dated Feb. 28, 2013 for corresponding PCT Application No. PCT/GB2011/051624.

* cited by examiner

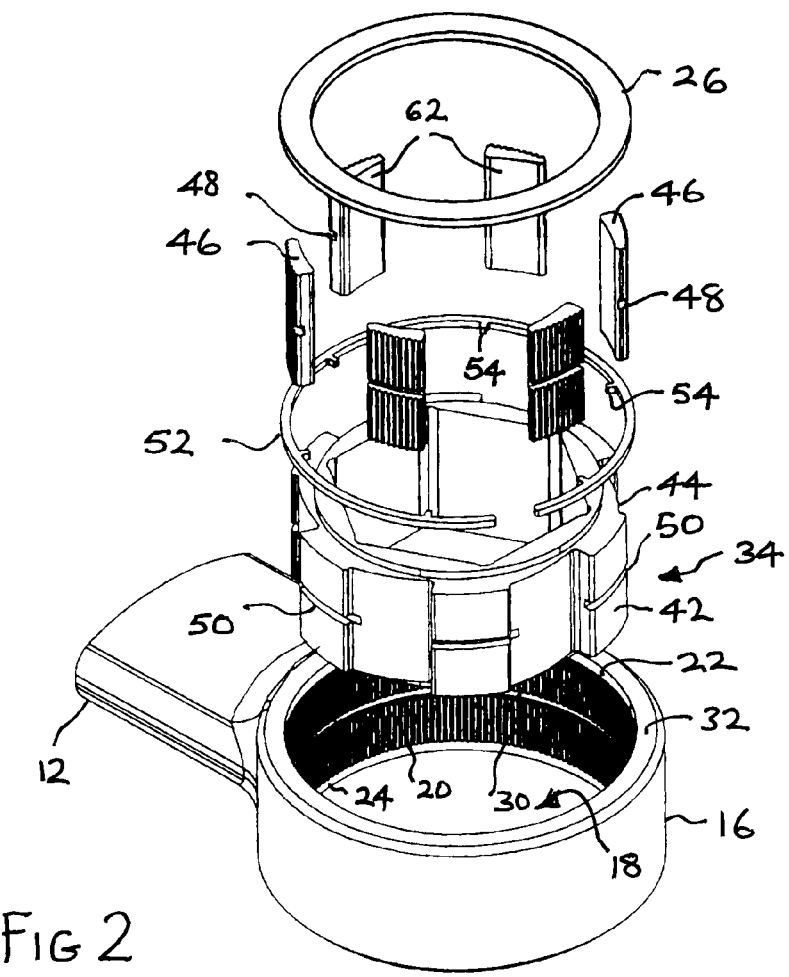
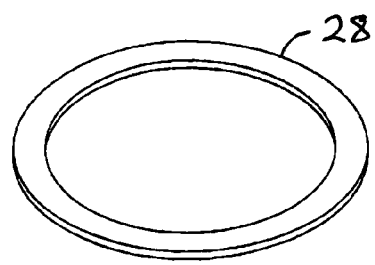
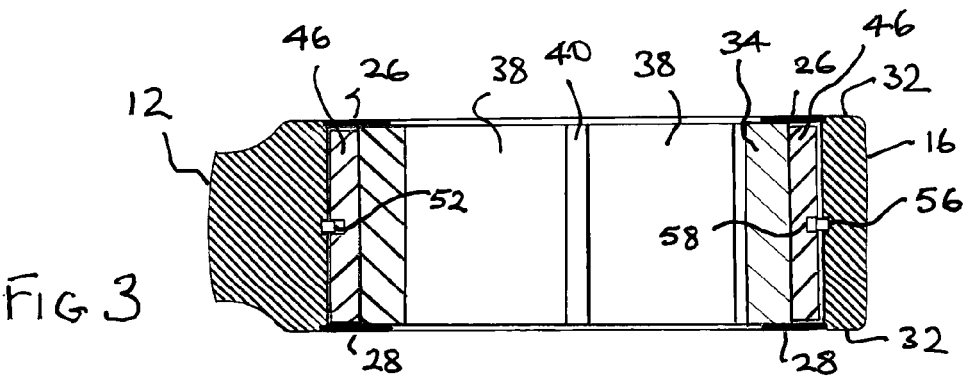
FIG 2
FIG 3

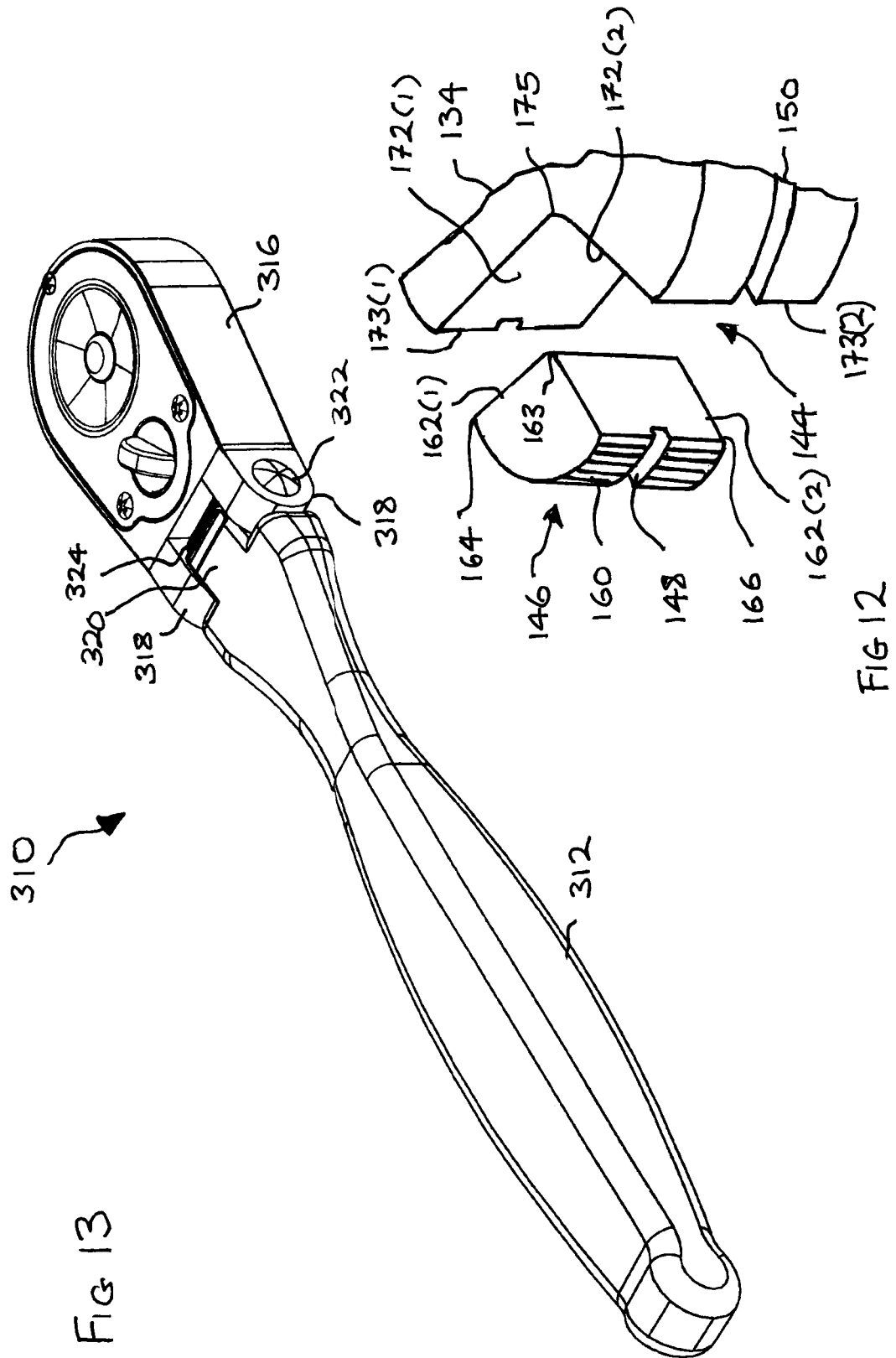

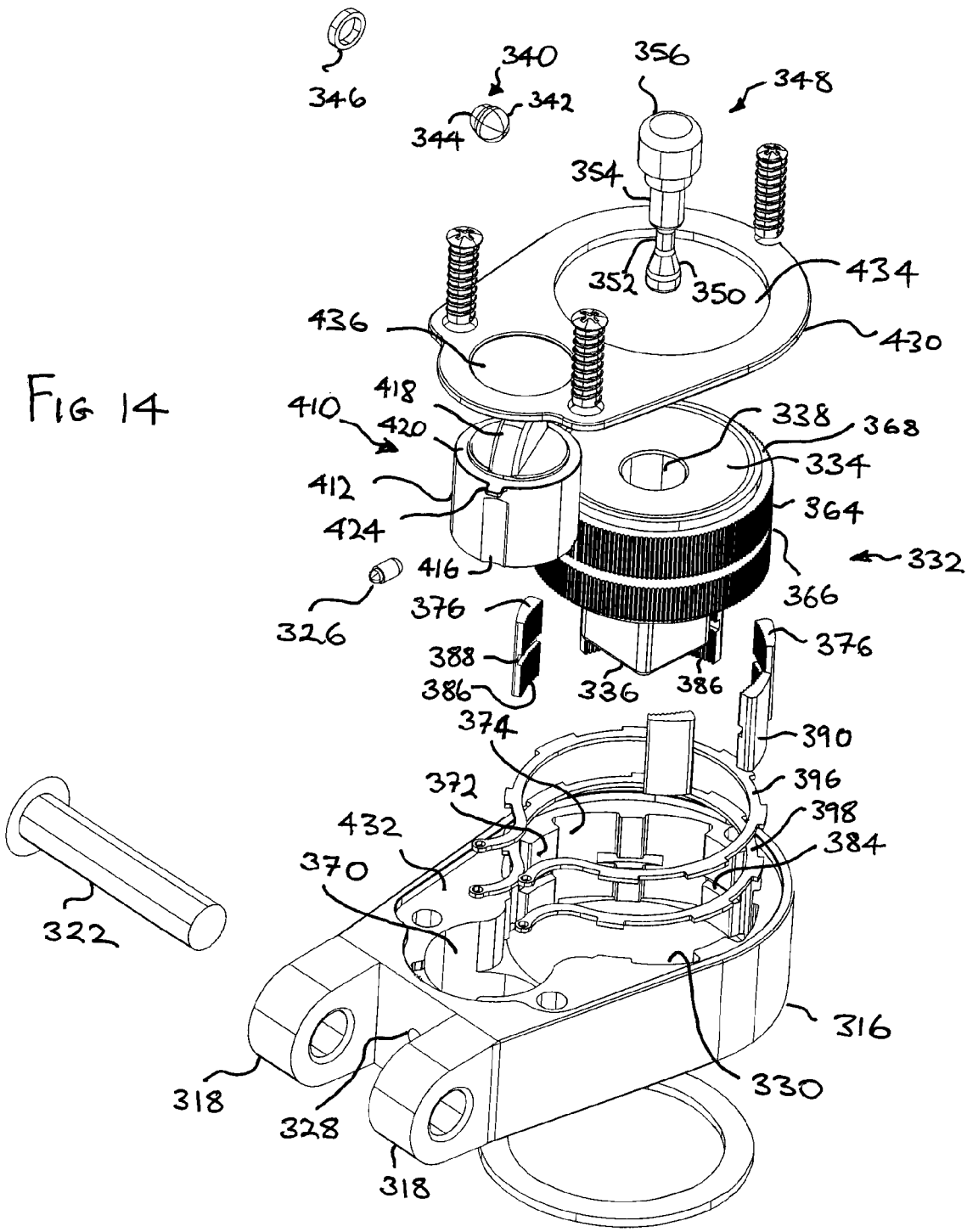

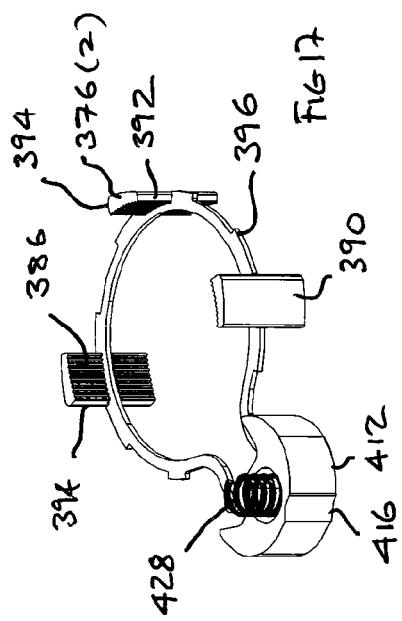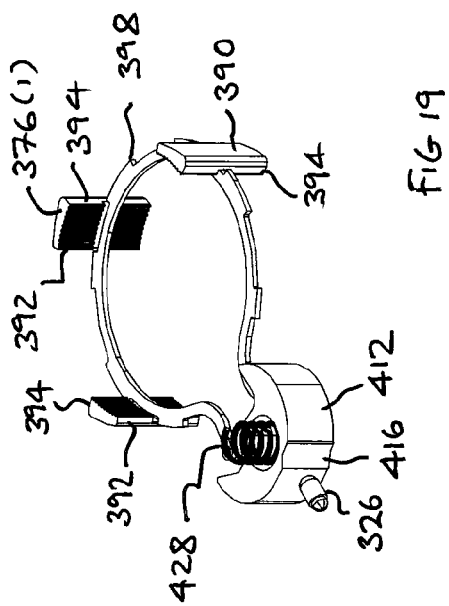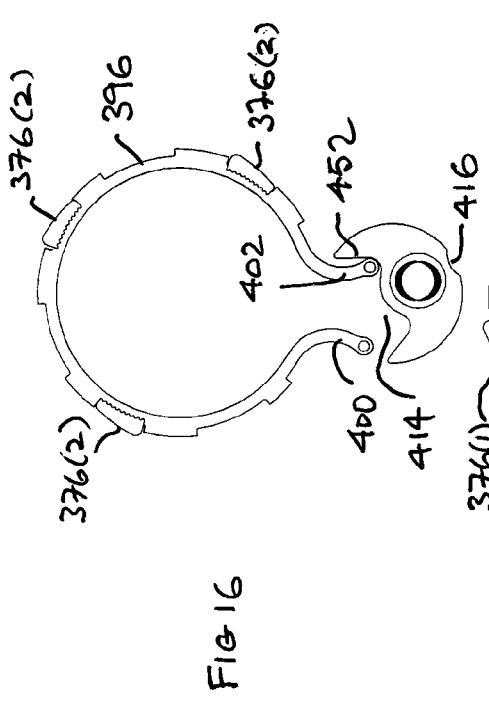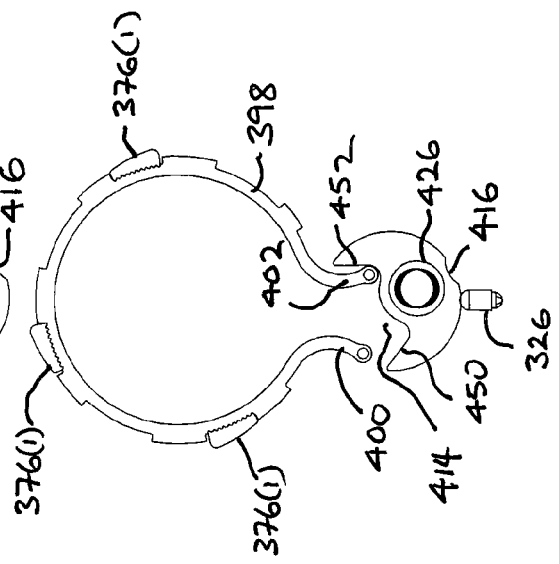

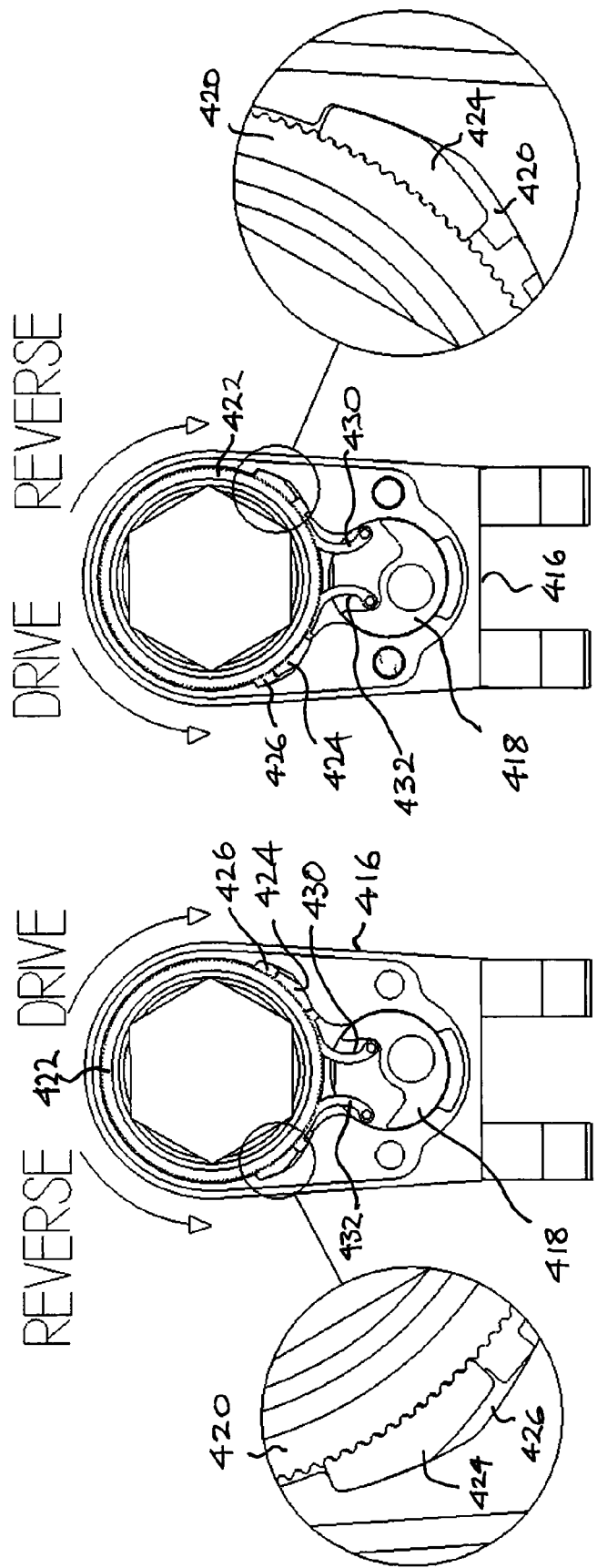

WRENCH RATCHET MECHANISMS AND WRENCHES

CROSS REFERENCE TO RELATED APPLICATIONS

The present application is a 371 U.S. national phase filing of PCT Application No. PCT/GB2011/051624, filed Aug. 30, 2011, which claims priority of European patent Application No. 10174563.6, filed Aug. 30, 2010.

1. Field of the Invention

The invention relates to wrench ratchet mechanisms and wrenches (often referred to in the United Kingdom as spanners).

2. Background to the Invention

Known ratchet wrenches may comprise a wrench head that houses a driven member. The driven member may be provided with an aperture shaped to receive an item that is to be driven. For example, the aperture may be a hexagonal aperture sized to receive a particular size of fastener head/nut. Alternatively, the driven member may comprise a spigot that projects from the wrench head to allow the wrench head to be connected to a drive socket.

The driven member may have a circumferentially extending surface provided with a series of teeth and a pawl fixed to the wrench head and engageable with the teeth. The engagement between the pawl and teeth is such that if the wrench head is turned in one direction the rotation of the wrench head is transmitted to the driven member and if the turned in the opposite direction the pawl slides over the teeth on the driven member. By this means the wrench can apply a torque to an item by turning the wrench head in one direction and the wrench handle can be repositioned with respect to the item by turning the wrench head in the opposite direction. Wrenches of this type may be provided with a pair of pawls that are selectively engageable with the driven member by means of a switch. The torque applying and handle repositioning directions of the wrench can be reversed by operation of the switch.

SUMMARY OF THE INVENTION

The invention provides a wrench ratchet mechanism comprising a driven member, a housing defining a chamber in which said driven member is at least partially received, a plurality of drive transmitting members disposed in respective recesses between said driven member and housing to transmit a drive force between said housing and driven member and a force applying member extending at least partially around said driven member and movable in a circumferential direction thereof to apply a circumferentially directed force to said drive transmitting members to move said drive transmitting members in said recesses from a non-drive transmitting position towards a drive transmitting position.

The invention also includes a wrench ratchet mechanism comprising a driven member, a housing defining a chamber in which said driven member is at least partially received, a plurality of drive transmitting members disposed in respective recesses between said driven member and housing to transmit a drive force between said housing and driven member and a force applying member extending at least partially around said driven member and movable to apply a force to said drive transmitting members to move said drive transmitting members in said recesses from a non-drive transmitting position towards a drive transmitting position, said force applying member engaging said housing and said driven member to secure said driven member in said housing.

The invention also includes a wrench ratchet mechanism comprising a driven member, a housing defining a chamber in which said driven member is at least partially received, at least one drive transmitting member disposed in a recess between said driven member and housing and moveable to transmit a drive force between said housing and driven member and a split ring securing said driven member in said chamber, said driven member having an axis of rotation, said housing having a height parallel to said axis of rotation and said split ring being disposed in a 50% midrange of said height centred on mid-height.

The invention also includes a sub-assembly for a wrench ratchet mechanism comprising a driven member to output a torque from said wrench ratchet mechanism, a plurality of wedging elements and a split ring force applying member, said wedging elements being at least partially received in respective recesses defined by said driven member and said force applying member extending about said driven member and wedging elements to secure said wedging elements to said driven member and being movable about said driven member to move said wedging elements in said recesses from a non-drive transmitting position to a drive transmitting position.

BRIEF DESCRIPTION OF THE DRAWINGS

In order that the invention may be well understood, some embodiments thereof, which are given by way of example only, will now be described with reference to the drawings in which:

FIG. 2 is an exploded perspective view of a wrench head of the wrench of FIG. 1 showing elements of a ratchet mechanism;

FIG. 3 is a cross-section on line III-III in FIG. 1;

FIG. 12 is an enlarged perspective view of a wedging element of the wrench head of FIG. 10;

FIG. 13 is a perspective view of yet another example of a wrench provided with a ratchet wrench head;

FIG. 14 is an exploded perspective view of a wrench head of the wrench of FIG. 13;

FIG. 16 is a bottom plan view of a switch and force applying member of the wrench of FIG. 13;

FIG. 17 is a perspective view corresponding to FIG. 16;

FIG. 18 is a bottom plan view of the switch of FIG. 16 and another force applying member of the wrench;

FIG. 19 is a perspective view corresponding to FIG. 18;

FIG. 21 is a plan view of a yet another ratchet wrench head with a cover removed to reveal internal components in a first operating condition; and FIG. 22 is a view corresponding to FIG. 21 showing a second operating condition

DETAILED DESCRIPTION OF THE ILLUSTRATED EMBODIMENT

Figure 1:
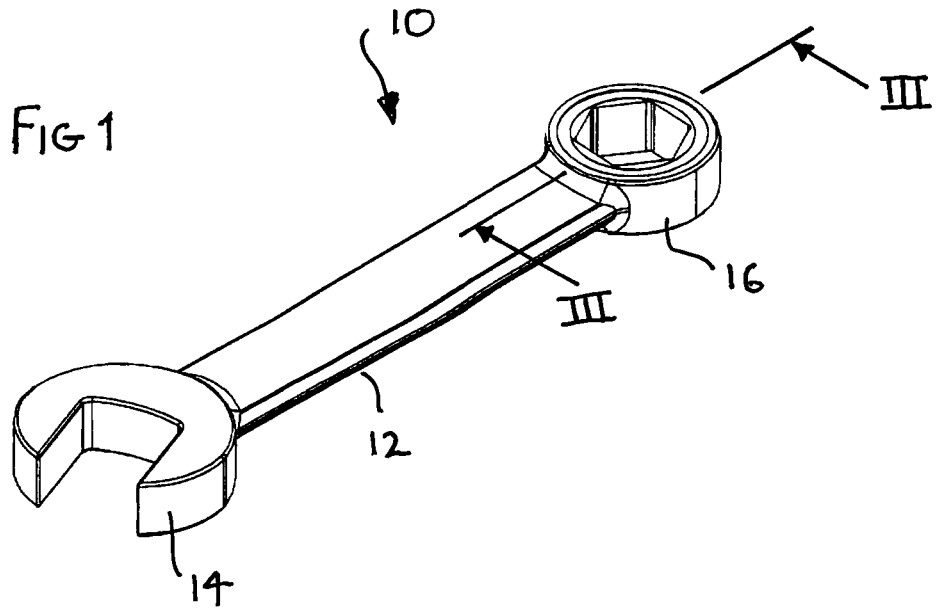
FIG. 1 is a perspective view of a wrench provided with a ratchet wrench head.

Referring to FIG. 1, a wrench 10 comprises a lever arm 12 provided at its ends with respective wrench heads 14, 16. The wrench heads 14, 16 are formed integrally with the wrench arm 12. In the illustrated example the wrench head 14 is an open-ended type that will be familiar to those skilled in the art and the wrench head 16 is a ratchet wrench head comprising a ratchet mechanism that is illustrated in FIGS. 2 and 3. It is to be understood that the illustrated configuration is purely an example and many variations are possible. For example, the wrench head 14 may be omitted so that the wrench has just one wrench head or replaced by a ring wrench head or a ratchet wrench head so that the wrench has two ratchet wrench heads.

Referring to FIGS. 2 and 3, the wrench head 16 is an annular body having an axially extending through-hole that defines a chamber 18. The chamber 18 has a circumferentially extending wall that faces radially inwardly of the wrench head 16 and is provided with a plurality of teeth 20. The teeth 20 are disposed in side-by-side relation and extend parallel to the axis of the chamber 18. In the illustrated example, teeth 20 are provided around the entire circumference of the chamber 18. At the respective ends of the chamber 18 there is a circumferentially extending groove 22, 24 (only one of which is visible in FIG. 2). The teeth 20 extend over at least substantially the entire axial length of the chamber 18 from one groove 22 to the other 24. The outer peripheries of respective sealing elements 26, 28 are housed in the grooves 22, 24. The sealing elements 26, 28 may be plastics rings that snap-fit into the grooves 22, 24 to prevent the ingress of dust and the like.

A further groove 30 is provided in the chamber wall through the teeth 20. The groove 30 extends around the entire circumference of the chamber 18. Although not essential, in the illustrated example the groove 30 is located substantially midway between the opposite ends of the chamber 18. That is, the groove 30 is disposed substantially halfway between the annular end faces 32 of the wrench head.

Figure 4:
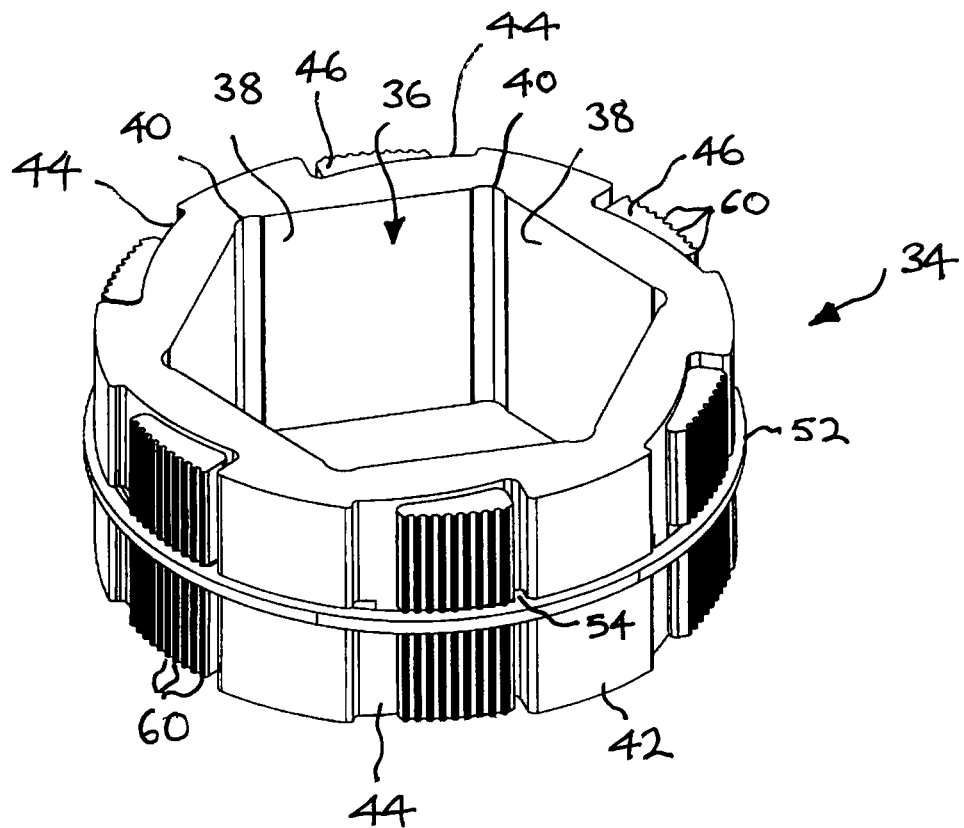
FIG. 4 is a perspective view of an assembly of a driven member and wedging elements of the ratchet mechanism of FIG. 2.

Referring to FIGS. 2 to 4, a driven member 34 is at least partially housed in the chamber 18. The driven member 34 comprises a generally annular body having an axially extending through-hole 36. The through-hole 36 is polygonal in cross-section and at least in part defined by a plurality of flat faces 38. Although not essential, the corners of the through-hole 36 are defined by respective arcuate portions 40 that separate adjacent flat faces 38. The polygonal through-hole 36 is sized to receive a particular size of nut/fastener head so that the wrench can be used to apply a torque to the nut/fastener head. In the illustrated example the through-hole 36 has six sides so that it can work on a hexagonal nut/fastener head. However, this is not essential. The through-hole can have any number of sides, for example four, six or twelve, and the configuration of the surfaces take any desired form suitable for the intended use of the wrench. It is also not essential that the driven member 34 has a through-hole to receive a nut/fastener head. Instead, the driven member 34 may be provided with a spigot that can be used to connect the driven member with a drive socket or the like.

The driven member 34 has a circumferentially extending sidewall 42. A plurality of recesses 44 are provided in the sidewall 42 to house respective drive transmitting members in the form of wedging elements 46. In the illustrated example there are six recesses 44 and wedging elements 46. However, this is not to be taken as limiting as the number of recesses/wedging elements can be varied as desired. As best seen in FIG. 2, each wedging element 46 is provided with a centrally disposed widthways extending groove 48. The sidewall 42 is provided with circumferentially extending grooves 50 that extend between the recesses 44. The grooves 48, 50 are arranged such that when the wedging elements 46 are positioned in the recesses 44, the grooves are aligned in the circumferential direction of the driven member 34. The wedging elements 46 are held on the driven member 34 by a split-ring force applying member 52 that is partially received in the grooves 48, 50.

The force applying member 52 is made of a resilient material such as, for example, spring steel. By moving the free ends of the force applying member 52 apart, the inner diameter of the force applying member can be increased sufficiently to allow it to be fitted over one end of the driven member 34 and slid past the driven member and wedging elements 44 in the axial direction of the driven member. When disposed opposite the grooves 48, 50 release of the end of the force applying member 52 allows it to resile to an unstressed condition in which portions of the inner periphery of the split ring are received in the grooves 48, 50. Thus, in the radial direction of the driven member 34 the wedging elements 46 are trapped between the driven member and the force applying member 52 and movement of the wedging elements in the axial direction of the driven member is limited to that allowed by the axial clearance provided between the force applying member and respective sets of grooves 48, 50. In this way the force applying member 52 acts to secure the wedging elements 46 to the driven member 34 to form a sub-assembly that can be inserted into the chamber 18 as a unit.

The force applying member 52 is provided with respective engagement members 54 to engage the wedging elements 46 to apply a circumferentially directed force to the wedging elements when the force applying member is moved in a circumferential direction thereof. The engagement members 54 extend radially inwardly of the split ring and in the illustrated example take the form of short generally rectangular projections. As shown in FIGS. 4 to 7, when the force applying member 52 is fitted on the driven member 34 the engagement members 54 project into the recesses 44 in which the respective wedging elements 46 are received.

The sub-assembly shown in FIG. 4 can be fitted into the chamber 18 by compressing the force applying member 52 to reduce its effective outside diameter, at least around a portion of the circumference thereof. This allows it to be pushed into the chamber 18 with the force applying member 52 bearing against and compressed by the teeth 20. Once inserted in the chamber 18 the sub-assembly can be slid axially in the chamber to a position in which the force applying member 52 is disposed opposite the groove 30. The force applying member 52 can then resile to a condition in which its outer periphery is received in the groove 30. As can be seen in FIG. 3, the sub-assembly is thus secured in the chamber 18 by engagement of the force applying member 52 in the grooves.

The force applying member 52 and the grooves 48, 50 in the wedging elements 46 and driven member 34 and the groove 30 in the wrench head 16 are sized such that when in the assembled condition shown in FIG. 3, the outer periphery of the force applying member is pressed firmly against the radially facing, or back, wall 56 of the groove 30 in the wrench head 16. The force applying member 52 is compressed by the engagement with the wall 56 so that it is resiliently engaged with the wall with sufficient force for rotation of the wrench head 16 to be transferred to the force applying member so that the force applying member rotates with the wrench head. However, there is no contact between the force applying member 52 and the radially facing, or back, wall 58 of the groove 48 in the wedging elements or with the radially facing, or back, wall of the grooves 50 in the driven member. Thus the circumferential movement of the force applying member 52 is transferred to the wedging elements solely by engagement of the engagement members 54 with the wedging elements.

Figure 5:
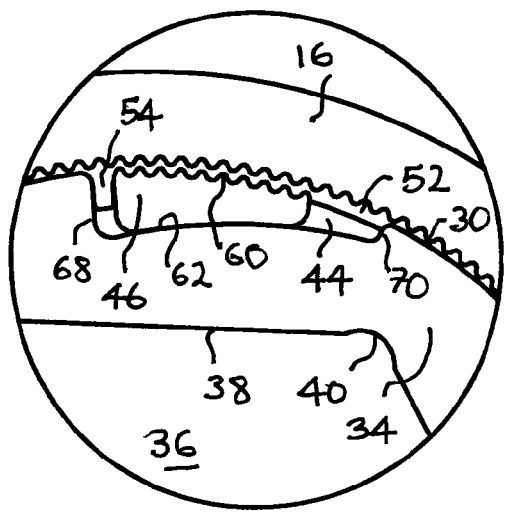
FIGS. 5 to 7 are plan views showing different positions of a wedging element with respect to the driven member.
Figure 6:
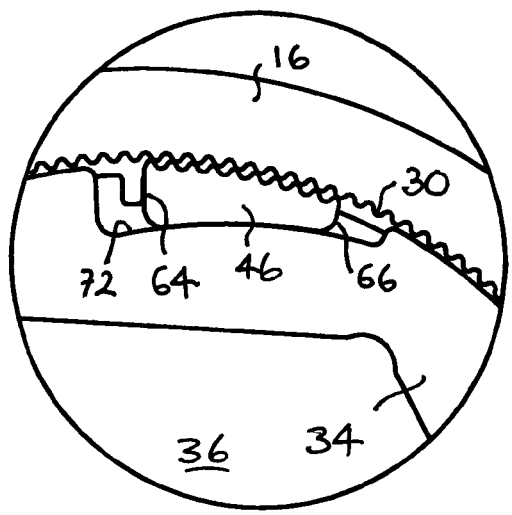
Figure 7:
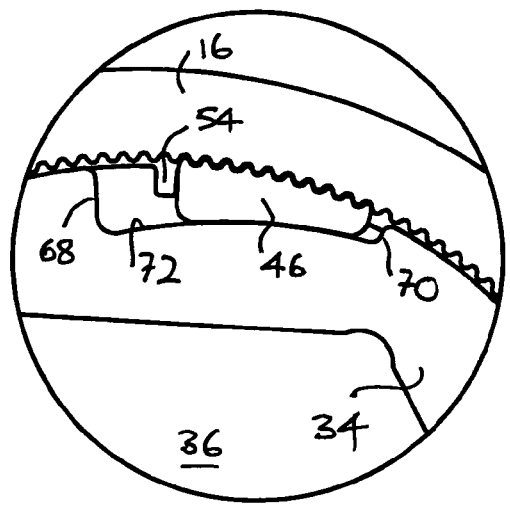

As best seen in FIGS. 5 to 7, the wedging elements 46 have a tapering cross-section defined by a convex major face that is provided with teeth 60 and a generally oppositely disposed concave major face 62. In the widthways direction, both major faces are arcuate. The curvature of the major faces is such that the cross-section of the wedging elements 46 tapers between a wider, trailing, end 64 and a narrower, leading, end 66.

The recesses 44 are generally U-shaped in cross-section and are defined by two generally radially extending sidewalls 68, 70 and a generally radially facing connecting wall 72 that extends in the circumferential direction of the driven member 34 and connects the two sidewalls. The wedging elements 46 are housed in the recesses 44 with their major faces 62 bearing against the oppositely directed connecting walls 72. It can be seen in FIGS. 5 to 7 that the sidewalls 68 are larger in radial extent than the sidewalls 70 so that in the circumferential direction of the wrench head 16 the recesses 44 have a depth that varies to provide a deeper end region adjacent the sidewall 68 and a shallower end region end adjacent the sidewall 70. Thus, in cross-section the recesses 44 narrow from a wider (deeper) end adjacent the sidewalls 68 to a narrower (shallower) end adjacent the sidewall 70. The wedging elements 46 are arranged in the recesses 44 such that their trailing ends 64 face the wider end of the recesses and their leading ends 66 face the narrower end.

The width of the recesses 44 (ie the distance between the sidewalls 68, 70) is greater than the width of the wedging elements 44 so that the wedging elements can move back and forth in the recesses in the circumferential direction of the driven member 34. The engagement members 54 of the force applying member 52 can engage the trailing ends 64 of the wedging elements to apply a circumferentially directed force to move the wedging elements towards a drive transmitting position at the narrower end of the recesses 44. The curvature of the connecting walls 72 is such that as the wedging elements 46 move from the wider end of the recess towards the narrower end of their recesses 44 a radial component of movement is added to the circumferential movement caused by the force applying member 52. As can be seen in FIGS. 5 to 7, the radial component of movement results in the wedging elements 56 moving outwardly of the driven member 34. Thus, in FIG. 4 it can be seen that in FIG. 5 the wedging element 46 is at least substantially entirely disposed within its recess whereas in FIGS. 6 and 7 it protrudes from the recess. In particular, the teeth 60 on the wedging elements 46 are moved into engagement with the teeth 30 on the wrench head. The connecting walls 72 function as a cam to cause the wedging elements 46 to move from a position (FIG. 5) in which the wedging elements 46 are disengaged from the wrench head to a position (FIG. 7) in which the teeth 60 on the wedging elements 46 fully engage the teeth 30 on the wrench head.

The teeth 30 on the wrench head 16 and the teeth 60 on the wedging elements 46 are generally sinusoidal in profile and the curvature of the connecting walls 72 and the face of the wedging elements on which the teeth are provided is such that all of the teeth on the wedging element substantially simultaneously engage with teeth on the wrench head as the wedging elements are moved towards their drive transmitting position at the narrower ends of the respective recesses 44.

Operation of the wrench head 16 to apply a clockwise directed torque to a nut/fastener head (not shown) received in the through-hole 36 will now be described with reference to FIGS. 5 to 7. Although only one of the wedging elements 46 is shown in FIGS. 5 to 7, it is to be understood that each of the other wedging elements will be making substantially the same movement due to the action of the force applying member 52.

FIG. 5 shows the wedge element 46 in a neutral position of the wrench head 16 in which it is unable to transmit a torque. A clockwise or anticlockwise force applied to the wrench head 16 (via the lever arm 12) will result in circumferential movement of the wrench head 16 and force applying member 52 relative to the driven member 34, which will not move with them. If the user applies a clockwise turning force (torque) to the lever arm 12, the wrench head 16 will turn clockwise and due to the friction between the outer periphery of the force applying member 52 and the radially facing wall 56 of the groove 30 in the wrench head, the force applying member 52 will turn with the wrench head. As previously described, there is no contact between the inner periphery of the force applying member 52 and the radially facing walls of the grooves 50, 58 in the driven member 34 and wedging elements 44 so the movement of the wrench head and force applying member is not immediately transmitted to the driven member.

As the force applying member 52 moves clockwise, the engagement member 54 presses against the trailing end 64 of the wedging element 46 thereby transmitting the circumferential movement of the force applying member to the wedging element. Referring to FIG. 6, it can be seen that the wedging element 46 has moved in the clockwise direction with the force applying member 52 and wrench head 16 and is in a position approximately midway between the ends of the recess 44. Due to the camming effect provided by the curvature of the connecting wall 72, the movement of the wedging element 46 includes a radial component and so the wedging element has moved towards the teeth 30 on the wrench head. At this stage, the wedging element 46 has still not engaged the wrench head and so no force is transmitted to the driven member 34.

Referring to FIG. 7, continued clockwise rotation of the wrench head 16 has brought the wedging element 46 to a drive transmitting position at the narrower end of the recess 44. In this position, the wedging element is wedged between the wrench head 16 and driven member 34 and the teeth 30 on the wrench head are fully engaged with the teeth 60 on the wedging element. Due to the wedged condition of the wedging element, a continued clockwise rotation of the wrench head 16 will result in a clockwise torque being applied to driven member 34 via the wedging element. If the resistance from the nut/fastener is high and the user has to apply considerable force to the wrench 10, there should be no slippage in the ratchet mechanism since the wedging element 46 will tend to be driven into firmer engagement with the wrench head and driven member.

If the user needs to reposition the lever arm 12 before applying further clockwise torque to the nut/fastener, he/she applies an anticlockwise turning force to the lever arm. This causes the wrench head 16 and force applying member to turn anticlockwise. Due to the engagement of the teeth 30 on the wrench head with the teeth 60 on the wedging element, the wedging element will move with the wrench head and force applying member and is thus pulled away from its drive transmitting position at the narrower end of the recess. As the wedging element 46 moves anticlockwise, it tends to follow the connecting wall 72 and retract from the wrench head 16 deeper into the recess 44. This brings the wedging element 46 to a position in which the teeth 60 no longer engage the wrench head 16 so that the wrench head can move independently of the driven member 34. Thus the lever arm 12 can be repositioned without affecting the position of the driven member and nut/fastener head with which the driven member is engaged.

If the users wishes to use the wrench head 16 to apply an anticlockwise torque to a nut/fastener head, he/she merely has to turn the wrench head 16 through 180° so that the leading ends 66 of the wedging elements 44 point in an anticlockwise direction.

Figure 8:
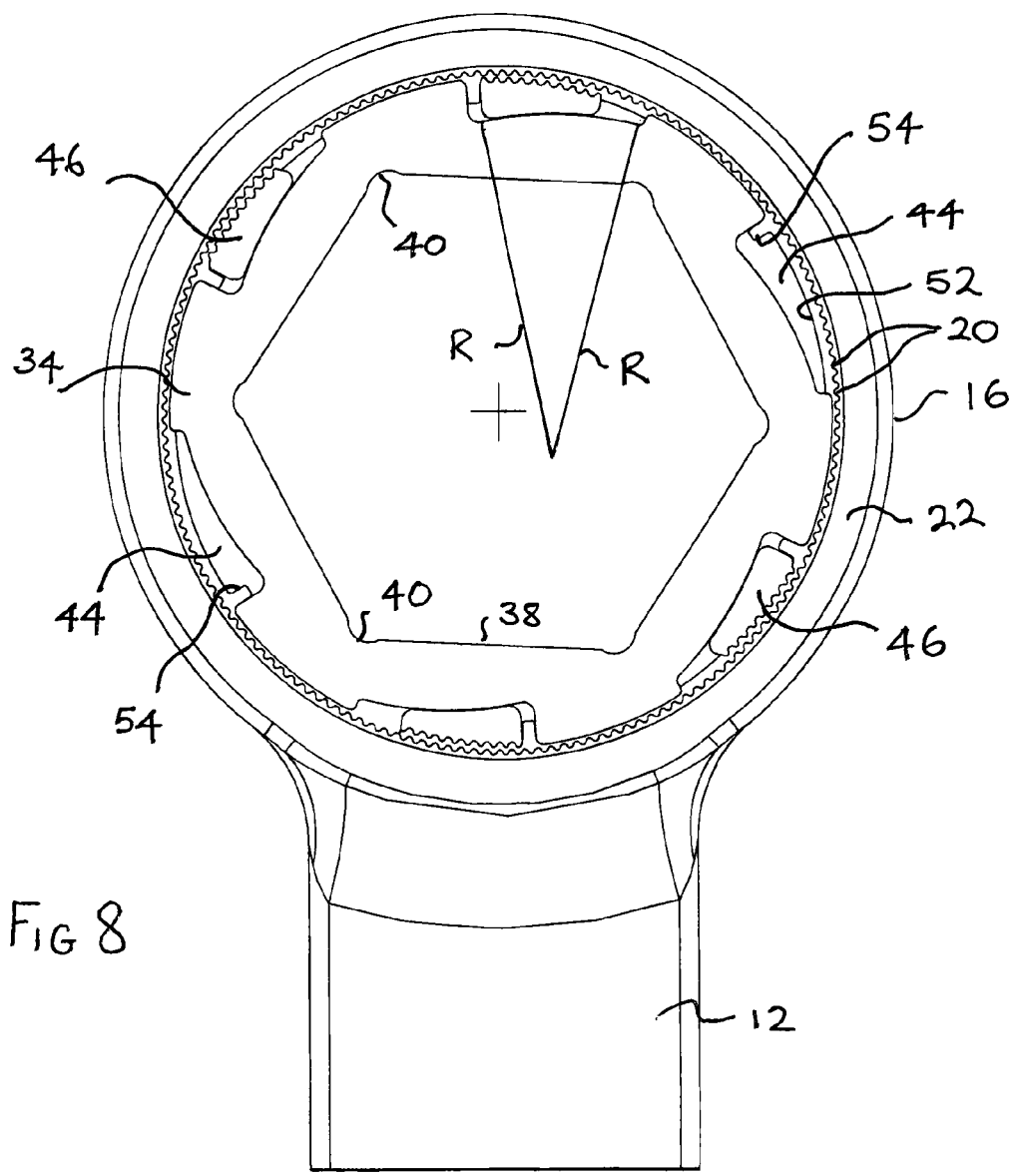
FIG. 8 is a plan view of the wrench head of FIG. 2 with a sealing element removed to reveal internal components.

Referring to FIG. 8, in one example the curvature of the connecting surfaces 72 is determined by a constant radius R that is at least substantially equal to the radius from the axial centre C of the driven member 34 to the toothed wall of the chamber 18. The centre of the radius R is offset from the centre C a distance sufficient to provide the recesses 44 with a depth sufficient to allow the wedging elements 46 to move out of engagement with the teeth 20.

As shown in FIG. 8, the recesses 44 are provided in the driven member 34 generally opposite the flat surfaces 34 and away from the arcuate portions 40. Thus, the recesses 44 are provided in thicker sections of the driven member 34 than would be the case if they were provided opposite the arcuate portions 40. This means that the diameter of the driven member 34 can be kept to a minimum and allows the overall size of the wrench head 16 to be kept small.

Figure 9:
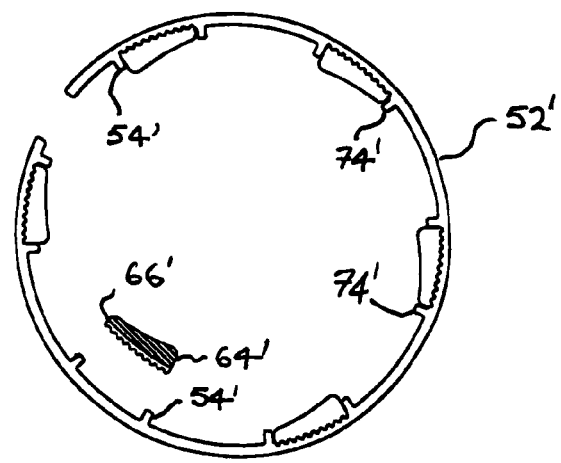
FIG. 9 is a plan view of a modified force applying member suitable for use in the ratchet wrench head of FIG. 1.

FIG. 9 is a plan view of a modified force applying member 52' that may be used in the wrench head 16 in place of the force applying member 52. The force applying member 52' comprises a split ring provided with radially projecting engagement members 54' to engage the trailing ends 64' of the wedging elements 46'. The modified force applying member 52' additionally comprises respective engagement members 74' to engage the leading ends 66' of the wedging elements. The modified force applying member 52' works in the same way as the force applying member 52, except that when the wrench head 16 is turned anticlockwise (as viewed in FIGS. 5 to 7), the engagement members 74' will engage the leading ends 66' of the wedging elements 46' to provide a positive circumferentially directed force to the wedge elements to force the wedge elements from their drive transmitting positions to a non-drive transmitting position. Thus, the force applying member 52' is able to transmit a positive circumferentially directed force to the wedging elements 46' in both the clockwise and anticlockwise direction so that the wedging elements 46' are reliably driven between their drive transmitting and non-drive transmitting positions. In the illustrated example, the engagement members 54', 74' define a pocket in which the wedging element 46' is held with its ends engaging the engagement members. This is not essential. In other non-illustrated examples there may be clearance between one or both of the engagement members 54', 84' and the associated end 64', 66' of the wedging element.

Figure 10:
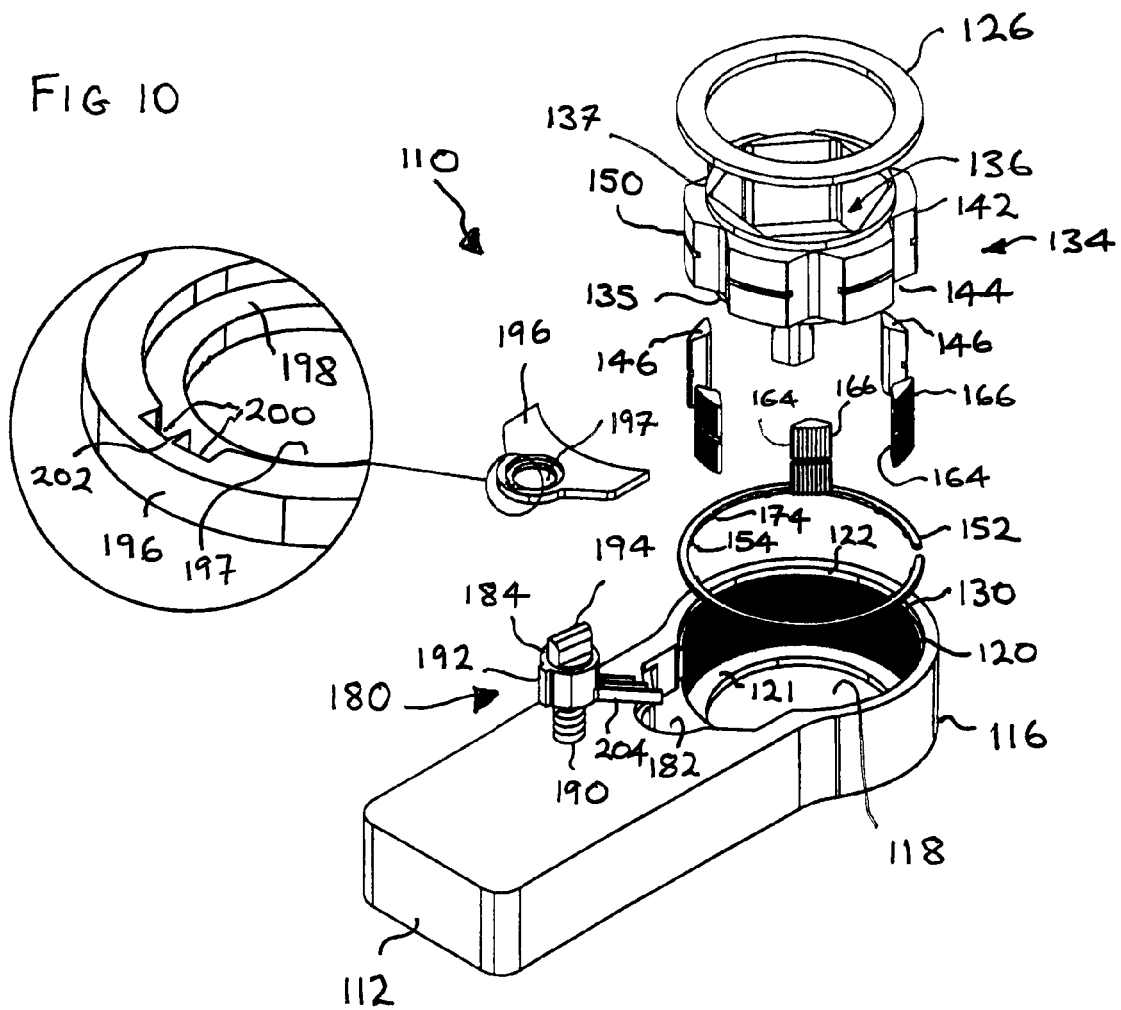
FIG. 10 is an exploded perspective view of another example of a wrench provided with a ratchet wrench head.
Figure 11:
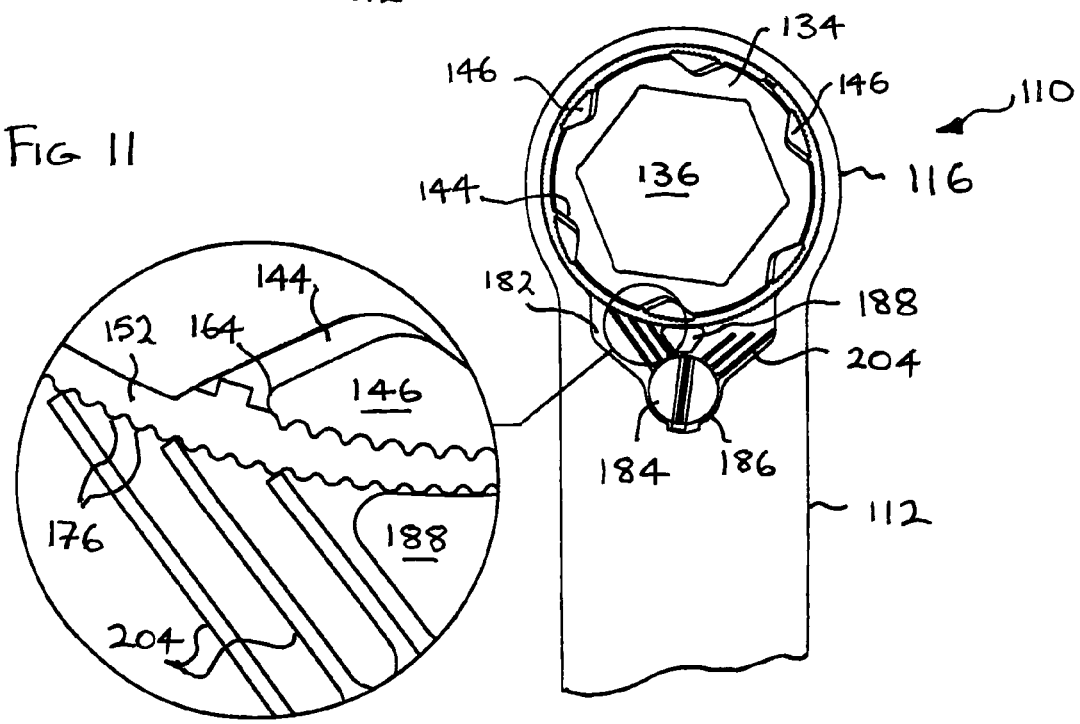
FIG. 11 is a plan view of the wrench of FIG. 10 with certain components omitted to reveal the interior thereof.

FIGS. 10 and 11 show another wrench 110 having a lever arm, or handle, 112 and a ratchet wrench head 116. In this example there is no wrench head at the end of the lever arm remote from the wrench head 116. However, it is to be understood this is not essential and an open end wrench head, such as the wrench head 14 shown in FIG. 1, a ring wrench head or another ratchet wrench head could be provided. The wrench 110 has many parts that are the same as, or similar to, those of the wrench 10. Similar or like parts are identified by the same reference numeral incremented by 100 and may not be described in detail again.

The wrench head 116 is an annular body having an axially extending through hole that defines a chamber 118. The chamber 118 has a circumferentially extending wall that faces radially inwardly of the wrench head 116 and is provided with a plurality of teeth 120. The teeth 120 are disposed in side-by-side relation and extend parallel to the axis of the chamber 118. In the illustrated example, teeth 120 are provided around the entire circumference of the chamber 118. The through-hole defining the chamber 118 has a stepped diameter so as to define a shoulder 121 at one end of the chamber. At the end of the chamber 118 opposite the end provided with the shoulder 121, there is a circumferentially extending groove 122 to receive a sealing element 126. Although not essential, in the illustrated example the teeth 120 extend over at least substantially the entire axial length of the chamber 118 between the shoulder 121 and groove 122. The sealing element 126 may be a plastics ring that snap-fits into the groove 122 to prevent the ingress of dirt and dust.

The chamber 118 is provided with a circumferentially extending groove 130 that is located approximately midway between the shoulder 121 and groove 122 and receives the outer periphery of a force applying member 152.

The wrench 110 comprises a driven member 134 that is housed in the chamber 118. The driven member 134 is provided with a relatively smaller diameter end portion to define an axle 135 that is received in the narrower diameter end of the through hole that defines the chamber 118 when the driven member is seated on the shoulder 121. At the end of the driven member 134 opposite the end provided with the axle 135 there is a relatively smaller diameter end portion 137 that is received in the sealing element 126. The driven member 134 additionally comprises an axially extending through-hole 136 that is configured to receive a particular shape and size of nut/fastener head.

The circumferentially extending side wall 142 of the driven member 134 is provided with a plurality of recesses 144 to receive respective driven transmitting members in the form of wedging elements 146. The sidewall 142 is provided with circumferentially extending grooves 150 that extend between the recesses 144. As best seen in FIG. 12, the recesses 144 are defined by mutually inclined planar surface portions 172(1), 172(2) that extend from the opposite sides 173(1), 173(2) of the recess to an arcuate connecting portion 175 defined at the centre of the recess. The surface portions 172(1), 172(2) face generally outwardly of the driven member 134.

Each wedging element 146 comprises an arcuate major surface provided with teeth 160. The teeth 160 extend in parallel side-by-side relation over the entire length (height) of the wedging element 146. A groove 148 extends across the toothed surface of the wedging element 146 between the two ends 164, 166 of the wedging element. The groove 148 extends through the teeth 160. When the wedging element 146 is received in the recess 144 the groove 148 is aligned with the grooves 150 provided in the driven member 134 so that the grooves 148, 150 can receive a split ring force applying member 152. The wedging element 146 additionally comprises a planar major face portion 162(1) extending from the end 164 and a planar major face portion 162(2) extending from the end 166. The face portions 162(1), 162(2) are mutually inclined to complement the surface portions 172(1), 172(2) and meet at an arcuate corner, or edge, 163 that extends parallel to the teeth 160 and ends 164, 166.

The generally V-shaped cross-section of the recesses 144 and wedging elements 146 allows the wedging elements to wedge between the wrench head 116 and driven member 134 at both ends of their recesses making the wrench 110 bi-directional.

Referring to FIG. 10, the force applying member 152 is the same as the force applying member 52' in that it has first and second engagement members 154, 174 to engage opposite ends of the wedging elements 146 to apply a circumferentially directed force in both the clockwise and anticlockwise directions. As best seen in the enlarged portion of FIG. 11, the force applying member 152 differs from the force applying members 52, 52' in that it has teeth 176 on its outer periphery. The teeth 176 face radially outwardly of the force applying member 152 to be engaged by a user operable switch 180.

The driven member 134, wedging elements 146 and force applying member 152 can be assembled in analogous fashion to the sub-assembly shown in FIG. 4 and fitted into the chamber 118 in the same way as the FIG. 4 assembly is fitted into the chamber 18.

The switch 180 is housed in a recess 182 defined in the lever arm 112. The recess 182 is contiguous with the chamber 118 to allow the switch 180 to engage with the force applying member 152. The switch 180 comprises a cylindrical body portion 184. The recess 182 includes a semi-cylindrical pocket 186. The pocket 186 is disposed on the axial centreline of the lever arm 112 and is the portion of the recess 182 disposed furthest from the chamber 118. A post 188 (shown in FIG. 11 and omitted from FIG. 10) is provided in the recess 182 opposite the pocket 186. The switch body portion 184 is disposed in the pocket 186. Lateral movement of the body portion 184 is restrained by the sidewall of the pocket 186 and the post 188 so that the switch 180 is constrained to rotational movement. The switch body portion 184 is provided with an axially extending blind bore (not visible in the drawings). An end of a compression spring 190 is received in the bore. The opposite end of the spring 190 is received in a bore (not visible in the drawings) formed in the base wall of the recess 182.

The switch body portion 184 is provided with a latch member 192 and a grip 194, both of which are integral parts of the body portion. The latch member 192 is a generally rectangular section projection that extends parallel to the axis of the body portion and is disposed in the innermost portion of the pocket 186. The grip 194 is a generally rectangular section projection provided on the end surface of the body portion 184 opposite the end surface in which the bore for the spring 190 is provided.

The recess 182 is closed by a cover 196. The cover 196 is provided with through-hole 197 and a counterbore 198. The cover 196 is shown upside down in FIG. 10 to reveal a pair of latch member receiving recesses 200 provided in a sidewall of the counterbore 198. When the cover 196 is fitted over the recess 182 the end of the switch body portion 184 provided with the grip 194 is received in the counterbore 198 and the grip projects through the through-hole 197 so as to be accessible to a user of the wrench 110. At the same time, a portion of the latch member 192 is engaged in one of the receiving recesses 200. In order to switch the latch member 192 from one recess to the other, the switch 180 is pushed into the wrench head 116 against the spring 190 to move the engaged portion of the latch member 192 out of the recess 200 in which it is engaged to release the switch so that it can be rotated. When the pressing force is removed, the spring 190 will bias the latch member 192 into engagement in an oppositely disposed recess 200.

The switch body portion 184 is provided with a plurality of projecting arms 204. The arms 204 are grouped in two sets, one on each side of an axis extending in the lengthways direction of the grip 194. The arms 204 in each group extend parallel to one another and are progressively longer so as to be able to engage the teeth 176 on the outer periphery of the force applying member 152. In the illustrated example there are three arms 204 in each set. However, in principle there may be any desired number of arms in each set. Optionally there may be just one arm to each side of the grip 194. The advantage of having sets of multiple arms is that it avoids the possibility of the force applying member 152 becoming stuck in a particular position due to the end of an arm 204 engaged between the free ends of the split ring.

In use, the force applying direction of the wrench 110 is set by means of the switch 180. The switch 180 can be rotated to bring one of the groups of arms 204 into engagement with the teeth 176 of the force applying member 152. With the arms 204 engaging the teeth 176 continued rotation of the switch 180 applies a circumferentially directed force to the force applying member 152. The circumferential movement of the force applying member 152 brings the first engagement members 154 or second engagement members 174 (depending on which direction the force applying member is being moved by the switch 180) with the respective ends 164, 166 of the wedging elements 146 to move the wedging elements to one side of their respective recesses 144 to the other. For example, starting from the position shown in FIG. 11, if the wrench 110 is to be used to apply a clockwise torque to a fastener head received in the through-hole 136 of the driven member 134, the switch body 184 is rotated in the anticlockwise direction. The anticlockwise rotation of the switch 180 brings the disengaged group of arms 204 into engagement with the teeth 176 of the force applying member while disengaging the group that are shown engaging the force applying member. Continued anticlockwise rotation of the switch 180 applies a force to the force applying member 152 to cause it to move circumferentially in the clockwise direction bringing the first engagement members 154 into engagement with the ends 166 of the respective wedging elements 146. The clockwise circumferentially directed force applied by the force applying member 152 to the ends 166 of the wedging elements 146 moves the face portions 162(1) of the wedging elements into engagement with the surface portions of the respective recesses 144. As the wedging elements 146 are pushed against the surface portions 172(1) a component of radial movement is imparted causing the wedging elements to move outwardly into engagement with the teeth 120 of the chamber wall. Thus, the surface portions 172(1) function as cams to impart a desired outward movement to the wedging elements. The switch 180 has a range of movement sufficient to move the wedging elements 146 to a position in which wedging elements are at the point of being wedged between the chamber wall and surface portions 172(1). At this position, the latch member 192 has clicked over from one recess to the other and secures the switch in place. The user is able to feel this positive latching, which signals that the wrench 110 is ready for use. The application of an anticlockwise torque to the lever arm 112 causes the wrench head to turn in an anticlockwise direction and the engagement between the teeth 120 on the chamber wall and teeth 160 on the wedging elements 146 forces the wedging elements to wedge fast between the wrench head 116 and surface portions 172(1) to transmit the applied torque to the driven member 134 from which it is transmitted to the fastener head received in the through hole 136.

In the same way as described in connection with the wrench 10, the greater the force applied to the lever arm, the greater will be the wedging effect between the wrench head, wedging elements and driven member so that the force should be transmitted without slippage between the parts. If the lever arm 112 needs to be repositioned before applying further torque to the fastener head, lever arm is turned anti-clockwise. Initially, this movement applies an anticlockwise force to the wedging elements 146 because the teeth 120 on the chamber wall are engaged with the teeth 176 on the outer periphery of the force applying member. Provided there is enough resistance provided by the fastener, the driven remember 134 does not move and so the wedging elements 146 move relative to the driven member towards the centre of their respective recesses and will tend to move radially inwardly of the wrench head so that the contact between the wedging elements and wrench head reduced sufficiently to allow the wrench head to rotate past the wedging elements. Once the lever arm 122 has been suitably repositioned, a clockwise torque can again be applied to the fastener by again turning the lever arm in a clockwise direction and wedging the wedging elements 146 between the teeth 120 and surface portions 172(1).

In order to reverse the torque applying direction of the wrench so that it can apply an anticlockwise torque, the switch 180 is turned clockwise to move the wedging elements 146 across the recesses 144 to bring the faces 162(2) into cooperating engagement with the surface portions 172(2) of the recesses.

Referring to FIGS. 13 and 14, a bidirectional wrench 310 comprises a lever arm 312 and a wrench head 316. The wrench head 316 is connected to the lever arm 312 by a clevis joint comprising two spaced apart ears 318 provided on the wrench head, a nose piece 320 extending from an end of the lever arm into a gap between the ears and a pivot pin 322 that extends through the ears and nose piece. The clevis joint connection allows relative rotation of the wrench head 316 and lever arm 312 about an axis defined by the pivot pin 322. The nose piece 322 is provided with teeth 324 that are engaged by a locking member 326. The locking member 326 is housed in a through hole 328 provided in a side of the wrench head 316 between the ears 318. As described in more detail below, the locking member 326 engages with a switch and operation of the switch allows the locking member to slide in the through hole 328 between a position in which it engages the teeth 322 to lock the lever arm 312 and wrench head 316 in a desired orientation and a position in which it is disengaged to allow relative rotation of the lever arm and wrench head.

Referring particularly to FIG. 14, the wrench head 316 is provided with a through-hole that defines a chamber 330 in which a driven member 332 is partially housed. The driven member 332 comprises a generally cylindrical body portion 334 that is housed in the chamber 330 and a spigot 336 that extends axially from an end of the body portion and projects from the chamber. The spigot 336 is generally rectangular in cross section. A blind bore 338 extends through the body portion 334 and terminates within the spigot 336. A transverse bore (not shown) extends through one side of the spigot 336 to intersect the blind bore 338 at location spaced from the inner end of the bore. A generally cylindrical locking member 340 is received in the transverse bore. The locking member 340 comprises a first domed end 342 and a second domed end 344. The first domed end 342 has a larger radius than the second domed end 344. The locking member 340 is disposed in the transverse bore such that the first domed end 342 is disposed inwardly of the second domed end 344. The locking member 340 is secured in the transverse bore by a ring 346. The ring 346 defines an aperture that is sized to allow the first domed end to project out of the spigot to lock a standard socket onto the spigot 336.

A release switch 348 is housed in the blind bore 338. The release switch is a generally cylindrical multi-diameter body that includes a taper portion 350 and a first cylindrical portion 352 that extends from the taper portion to a second cylindrical portion 354 that has a larger diameter than the first cylindrical portion. At one end the release switch 348 has a button 356. The release switch 348 is received in the blind bore 338 with the button 356 projecting from the bore and the taper portion 350 disposed between the innermost end of the bore and the location at which it is intersected by the transverse bore. A compression spring (not shown) is fitted around the second cylindrical portion 354 of the release switch 348 with one end in engagement with the underside of the button 356 and the other end engaging a step (not shown) defined by a change of diameter of the bore 338. The spring applies a force to the button that pushes the button outwardly of the bore 338 and draws the taper portion 350 into engagement with the first domed end 342 of the locking member 340. The taper portion 350 applies a force to the locking member 340 that pushes it outwardly of the spigot 336 to provide a locking force to keep a socket locked onto the spigot. To release the socket, the button 356 is pushed into the blind bore 338 against the action of the spring. This pushes the taper portion 350 away from the locking member 340 and brings the first cylindrical portion 352 to a position opposite the inner end of the transverse bore. The movement of the taper portion 350 removes the locking force, allowing at least a part of the first domed end 342 of the locking member to be pushed back from the transverse bore into a space in the blind bore 338 made available by the positioning of the first cylindrical portion 352 opposite the end of the transverse bore. When the user releases the button 356, the taper portion 350 is drawn back into engagement with the locking member 340 by the spring to restore the locking force.

The body portion 334 of the driven member 332 has a circumferentially extending sidewall that is provided with teeth 364. The teeth 364 are disposed side by side and extend parallel to the axis of the body portion 334. A circumferentially extending groove 366 extends through the teeth 364 into the sidewall. Respective grooves 368 (only one of which can be seen in FIG. 14) are provided at each end of the sidewall of the body portion 334. The teeth 364 extend from one groove 368 to the other.

Figure 15:
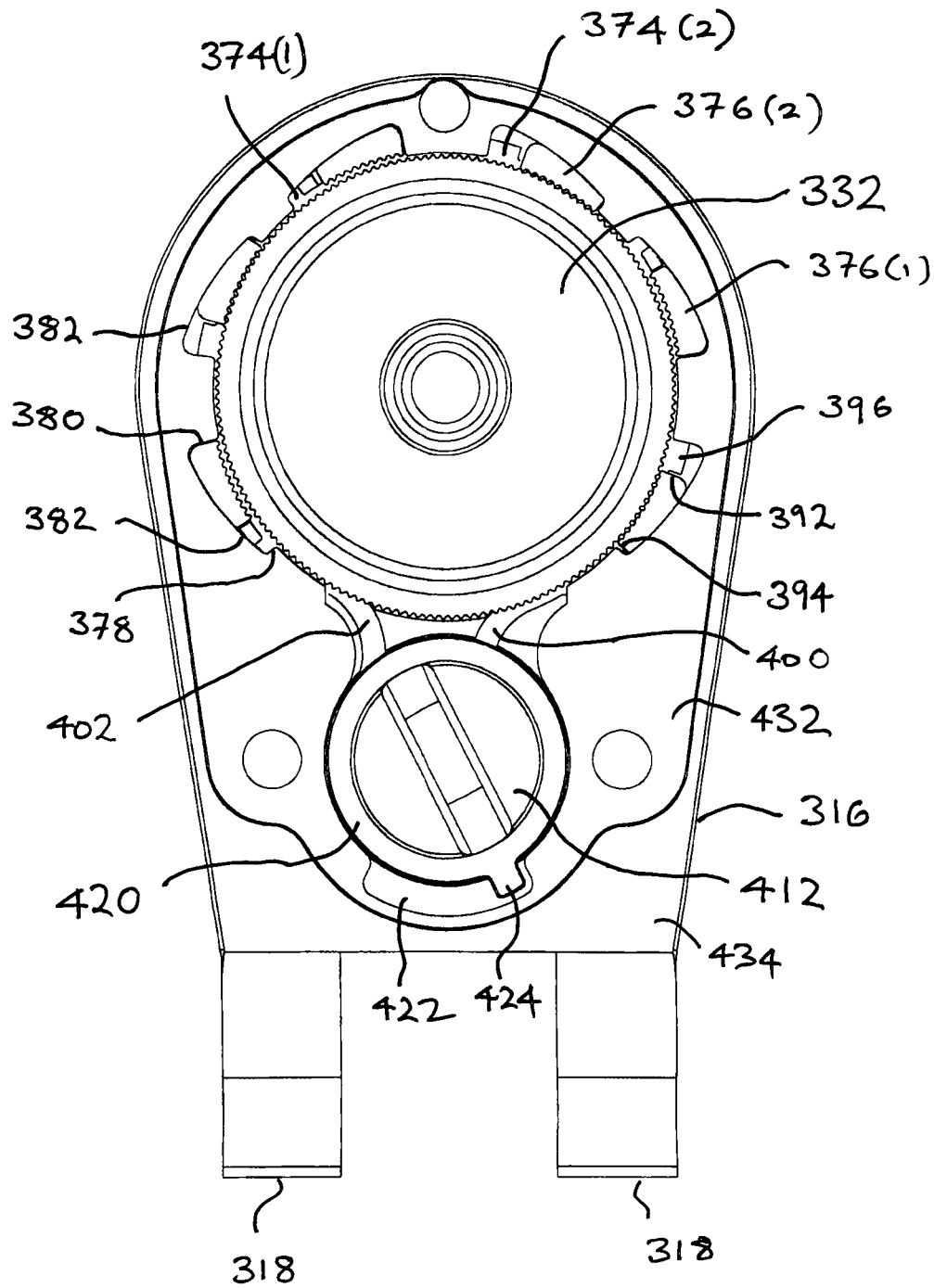
FIG. 15 is a top plan view of the wrench head of FIG. 14 with a cover removed to show internal components.

As shown in FIGS. 14 and 15, the chamber 330 is defined by a generally circular section through hole that extends through the wrench head 316. A recess 370 is defined in the wrench head 316 between the through hole and the wall from which the ears 318 project. The recess 370 opens into the chamber 330 through a gap in the sidewall 372 of the chamber. A plurality of recesses 374 is defined in the sidewall 372 to receive respective wedging elements 376. As best seen in FIG. 15, the recesses 374 are generally U-shaped in cross-section and are defined by two generally radially extending sidewalls 378, 380 and a generally radially facing connecting wall 382 that extends in the circumferential direction of the wrench head 316 to connect the sidewalls. The sidewall 378 is smaller in radial extent that the sidewall 380 so that in the circumferential direction the recesses 374 have a depth that varies to provide a relatively shallow end region adjacent the sidewall 378 and a relatively deep end region adjacent the sidewall 380. In the illustrated example, the wrench head is provided with two sets of three recesses 374. The recesses 374(1) of the first set are arranged such that their shallow ends point in an anticlockwise direction and the recesses 374(2) of the second set are arranged such that their shallow ends point in a clockwise direction. The portions of the sidewall 372 between the recesses 374 are provided with grooves 384. As shown in FIG. 14, the grooves 384 formed in sidewall portions that are adjacent a narrow end of a recess 374 extend into the connecting wall 382 of the recess.

The wedging elements 376 are identical to the wedging elements 46 of the wrench 10, except that the teeth 386 and widthways extending groove 388 are provided on the concave major face rather than the convex major face 390. Thus, the curvature of the major faces of the wedging elements 376 is such that in cross-section the wedging elements taper between a wider trailing end 392 and a narrower leading end 394. The wedging elements 376 are positioned in their respective recesses 374 such that their trailing ends 392 face the wider end of the recess and the leading ends 394 face the narrower end of the recess.

The curvature of the connecting walls 382 of the recesses 374 and convex surfaces 390 of the wedging elements 376 is such that a radial component of movement will be imparted to the wedging elements when they move from the deep end to the shallow end of their recesses. Thus, the connecting walls 382 provide a camming effect in the same way as the connecting walls 72 of the wrench 10, only difference being that in the wrench 10 a radially outwardly directed component of movement is imparted to the wedging elements and in wrench 310 the movement is radially inwards.

The wrench head 316 is provided with two force applying members 396, 398 that are fitted into the chamber 330 with the member 396 disposed on the member 398. The grooves 384 in the chamber wall and the grooves 388 in the wedging elements 376 have sufficient height to receive the superimposed force applying members 396, 398 with a small clearance.

In the illustrated example the force applying members 396, 398 are identical in construction. As shown in FIGS. 16 to 19, the force applying members 396, 398 are each split rings that are bent at their ends to define two spring tails 400, 402. Each force applying member 396, 398 defines three pockets in its outer periphery to receive respective wedging element 376. The pockets are disposed asymmetrically with respect to a centre line that extends through the space between the spring tails 400, 402 and the portion of the split ring diametrically opposed to the space. The asymmetric arrangement of the pockets is such that by turning one force applying member 398 through 180° (to the position shown in FIG. 18) and superimposing the force applying member on the other force applying member 396 when in the position in FIG. 16, the pockets are spaced around the periphery of the superimposed force applying members to provide a series of six that when the force applying members are fitted in the chamber 330 will be disposed opposite the six recesses 374. In FIGS. 16 to 19, the three wedging elements that are received in the set of recesses 374(1) are the wedging elements 376(1) and the three wedging elements that are received in the set of recesses 376(2) are the wedging elements 376(2). Thus, the wrench head 316 has two sets of wedging elements 376(1), 376(2) disposed in respective recesses 374(1), 374(2) and respective force applying members 396, 398 to apply a circumferentially directed force to the wedging elements. As described in more detail below, the set of wedging elements 376(1) is active when the wrench 310 is used to apply an anticlockwise torque and the set of wedging elements 376(2) is active when the wrench is used to apply a clockwise torque.

The wrench head 316 is provided with a switch 410 that is used to switch the wedging elements 376 between their active and inactive conditions. The switch 410 is also operable to control locking of the lever arm 312 by the locking member 326.

The switch 410 comprises a generally cylindrical body portion 412 that is seated in the recess 370 in the wrench head. As best seen in FIG. 15, the sidewall of the recess 370 closely surrounds the sidewall of the body portion 412 so that the switch 410 is constrained to rotate in the recess. The body portion 412 defines a recess 414 (FIGS. 16 to 19) that faces into the chamber 330. Diametrically opposite the recess 414 the body portion 412 is provided with a generally axially extending groove 416. An end of the locking member 326 is received in the groove 416 when the switch 410 is rotated to a position in which the groove is disposed opposite the through hole 328.

One end of the body portion 412 is provided with a grip 418. In the illustrated example the grip is an elongate member extending diametrically across the body portion 412 and is integral with the body portion. The end of the body portion 412 at which the grip 418 is provided is fitted with a tab washer 420. As best seen in FIG. 15, the wrench head 316 is provided with a recess 422 that receives the tab 424 of the tab washer 420.

As shown in FIGS. 17 and 19, an axially extending blind bore 426 is provided in the end of the switch body portion 412 opposite the end provided with the grip. The blind bore 426 houses one end of a compression spring 428. The other end of the compression spring 428 is received in a bore (not shown) provided in the base wall of the recess 370. The compression spring 428 provides an upward bias to drive the tab washer 420 into contact with the underside of a cover 430 (FIG. 14) that is seated in a recess 432 provided in a major surface 434 of the wrench head. The cover 430 is screwed in place in the recess 432 to provide a resistance to the upward biasing force provided by the compression spring 428.

Figure 20:
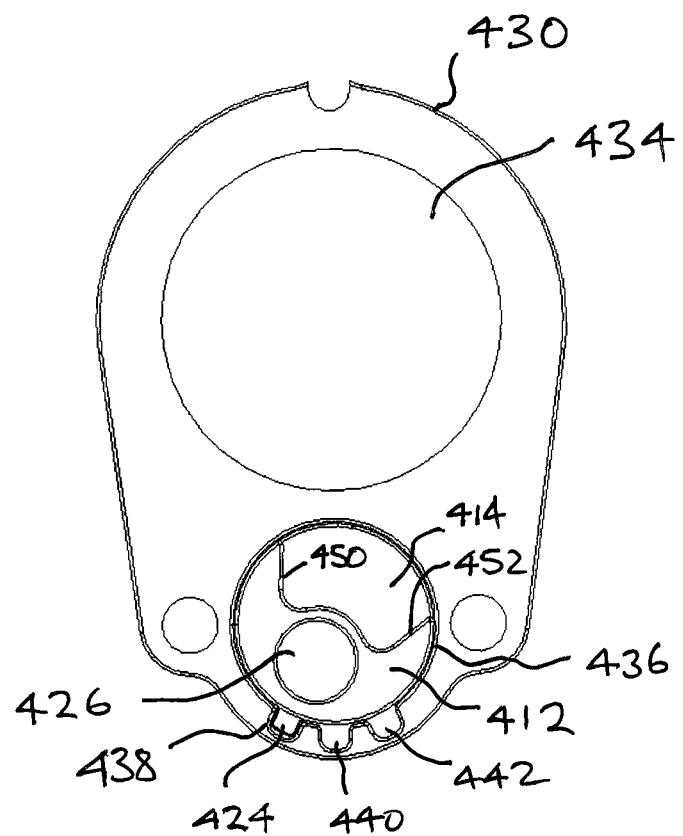
FIG. 20 is a plan view of the underside of a cover of the wrench of FIG. 13.

As shown in FIG. 14, the cover 430 has an aperture 434. The aperture is sized such that the cover 430 can seat on the shoulder defined by the groove 368 provided at the end of the driven member body portion 334 from which the switch button 356 projects. The cover 430, which may be made of a plastics material, engages the driven member 332 to form a dust/dirt seal. The cover 430 is provided with a second aperture 436 that is sized to seat on the tab washer 420 at the grip end of the switch 410. As shown in FIG. 20, the underside of the cover 430 is provided with three recesses 438, 440, 442 that open into the aperture to receive the tap 424 of the tab washer 420. The recesses 438-442 define three switch positions of the switch 410. The switch 430 can be moved between the switch positions by pressing the switch into the recess 470 against the spring 428 so that the tab 424 is moved out of the plane of the cover to release the switch and free it for rotation in the recess 370. When the switch has been turned to a desired position, removing the force applied against the compression spring 428 allows the spring to drive the switch into engagement with the cover and, in particular, the tab into the appropriate recess 438-442. The engagement of the tab 424 in a recess 438-442 locks the switch 410 against accidental movement.

In use of the wrench 310, the switch 410 is operated to determine a particular use condition. For example, if the relative orientation of the lever arm 312 and wrench head 316 is to be adjusted, the switch 410 is turned to a central position in which the tab 424 is located in the central recess 440 defined in the cover 430. In this position of the switch 410, the groove 416 in the body portion 412 of the switch is disposed opposite the through hole 328 that houses the locking member 326. If the lever arm 312 and wrench head 316 are then pivoted relative to one another, the relative movement will push against the locking member 326, which can move back in the through hole into the space defined by the groove 416.

This releases the lock between the lever arm and wrench head. Once the desired orientation is obtained, the switch 410 is pressed against the compression spring 428 to release the tab 424 from the central recess 440 and then turned to select the torque applying direction of the wrench. Once the direction is selected, the switch is released to force the tab 424 into engagement with the appropriate one of the recesses 438, 442 to lock the switch 410 in position. This rotation of the switch 410 moves the groove 416 out of alignment with the through hole 328 and brings the sidewall of the body portion 412 into engagement with the inner end of the locking member 326. This forces the locking member outwardly in the through hole 328 to engage the teeth 324 on the nose piece 322 of the lever arm 312 and lock the lever arm in the selected orientation relative to the wrench head 316.

As shown in FIGS. 16 to 20, the spring tails 400, 402 of the force applying members 396 398 are received in the recess 414 of the switch 410. The recess 414 is approximately U-shaped with sidewalls 450, 452. The sidewalls 450, 452 are mutually inclined so as to converge towards the inner end of the recess 414. When the switch 410 is turned in an anticlockwise direction (as viewed in FIGS. 16 to 20), sidewall 452 is drawn into engagement with the spring tails 402 of the force applying members 396, 398. As the switch 410 is turned and the end of the spring tail 402 moves along the sidewall 452, the force applying members 396, 398 are pulled in an in a clockwise direction. The force applying members 396, 398 thus make a clockwise movement about the driven member 332 and apply a clockwise directed circumferentially directed force to the wedging elements 376. If the switch is turned in a clockwise direction, the sidewall 450 is brought into engagement with the spring tails 400 of the force applying members 396, 398. This causes the force applying members 396, 398 to move anticlockwise about the driven member and applies an anticlockwise circumferentially directed force to the wedging elements 374. In this way, the circumferentially directed force applied by the force applying members 396, 398 can be used to move the wedging elements 376 between the shallow and deep ends of their respective recesses 374 to switch them from their active to their inactive conditions.

In the position of the switch 410 shown in FIG. 15, the tab 424 is received in the recess 438 as shown in FIG. 20. In the position of the switch 410 shown in FIGS. 17 to 19, the tab 424 is received in the recess 442. When the tab is in the recess 438, the wedging elements 376(2) in the recesses 374(2) are disposed at the shallow end of the recesses with their leading ends 392 adjacent the respective sidewalls 378 of the recesses. This puts the wedging elements 376(2) an active. At the same time, the wedging elements 376(1) are at the deep ends of the recesses 374(1) with their trailing ends adjacent the sidewalls 380. This puts the wedging elements 376(1) in an inactive condition. When the wedging elements 376(2) are in an active condition, the wrench 310 is operable to apply an anticlockwise torque (as viewed in the drawing). If the switch is turned so that the tab 324 is received in the recess 442, the wedging elements 376(1) become active and the wedging elements 376(2) become inactive so that the wrench 410 is operable to apply a clockwise torque.

With the wedging elements 376(2) in the active condition shown in FIG. 15, if an anticlockwise force is applied to the lever arm 312, the wedging elements 376(2) become tightly wedged in the shallow ends of their recesses 374(2) thereby locking the wrench head 316 and driven member 332 together so that the applied torque is transmitted to the driven member, which applies the torque to a socket or the like that is locked onto spigot 336. If the lever arm 312 needs to be repositioned to continue the application of an anticlockwise torque, it is turned clockwise. As the wrench head 316 turns clockwise, the wedging elements 376(2) are released from wedging engagement with the driven member 332 allowing the wrench head and wedging elements to turn independently of the driven member. Once the lever arm 312 is suitable repositioned, an anticlockwise force is again applied to the lever arm 312. The convex surfaces 390 of the wedging elements 376(2) are engaged by the connecting walls 382 of their respective recesses 374(2) to provide a radial component of movement to the wedging elements that drives their teeth 386 into engagement with the teeth 364 on the driven member 332. The wedging elements 376(2) become wedged between the driven member and wrench head to transmit the anticlockwise torque as before.

To reconfigure the wrench 310 to apply a clockwise torque, the switch 410 is rotated in a clockwise direction as viewed in FIG. 15. This rotation of the switch releases the spring tail 400 from engagement with the sidewall 450 of the recess 414 and brings the sidewall 452 into engagement with the spring tails 402 (as shown in FIGS. 16 to 19). As the switch 410 is turned the end of the spring tails 402 engaging the sidewall 452 moves along the sidewall as the force applying members 396, 398 are pulled in an anticlockwise direction around the driven member 332 by the force applied by the switch. The movement of force applying members 396, 398 applies a circumferentially directed force to the wedging elements 376. Specifically, the force applying member 396 applies a circumferentially directed force to the leading ends 394 of the wedging elements 376(2) that moves the wedging elements to the deep ends of their respective recesses 374(2). At the same time, the force applying member 398 applies a circumferentially directed force to the trailing ends 394 of the wedging elements 376(1) to move them from the deep ends to the shallow ends of their respective recesses 374(1). Thus, the wedging elements 376(2) are moved from an active drive transmitting position to a non-active non-drive transmitting position while the wedging elements 376(1) are moved from an inactive non-drive transmitting position to an active drive transmitting position. Operation of the wrench 310 to apply a clockwise torque is then as previously described with the clockwise/anticlockwise directions reversed.

FIGS. 21 and 22 show another example of a ratchet wrench head 416 that may be used with the lever arm 312 of FIG. 3. The wrench head 416 combines features of the wrench head of the wrench 110 and the wrench head 316 of the wrench shown in FIG. 14. Specifically, the wrench head employs a switch 418 that is used to pull a force applying member 420 about the driven member 422. The circumferential movement of the force applying member 420 about the driven member 422 is used to apply a circumferentially directed force to a plurality of wedging elements 424 that are received in respective recesses 426. The wedging elements 424 and recesses 426 are generally V-shaped in cross section. Thus, the wrench head 416 is capable of bi-directional operation and in the same way as in the wrench 110 the direction in which the wrench head can apply a torque is determined by which side of the recesses 426 the wedging elements 424 are disposed.

In FIG. 21, the wedging elements 424 are shown engaging the left hand (as viewed in the drawing) flanks of their respective recesses 426. In this position, the wrench head 416 is operable to apply a clockwise torque as when the wrench head is turned in a clockwise direction, the wedging elements 424 become tightly wedged between the wrench head 416 and driven member 422 so that the parts become locked and a torque applied to the wrench head 416 is transmitted to the driven member.

In order to change the operating direction of the wrench head 416, the switch 418 is turned in the anticlockwise direction (as viewed in FIGS. 21 and 22). This releases the spring tail 430 of the force applying member 420 from engagement with the switch 418 and brings the switch into engagement with the spring tail 432 at the opposite end of the force applying member. As described above in connection with the wrench 310, the operation of the switch 418 pulls the force applying member 420 about the driven member 422. This circumferential movement of the force applying member 420 applies a circumferential force to the wedging elements 424 that moves them across their respective recesses 426 to bring them into engagement with the right hand flanks (as viewed in the drawings) of the recesses. In this position, the wrench head 416 is operable to apply a anticlockwise torque as when the wrench head is turned in an anticlockwise direction, the wedging elements 424 become tightly wedged between the wrench head 416 and driven member 422 so that the parts become locked and a torque applied to the wrench head 416 is transmitted to the driven member.

Thus, the wrench head 416 provides bi-directional capability using a switch system corresponding to the wrench 310, but does not require two sets of wedging elements/recesses with respective force applying members. This makes the wrench head simpler. If desired, two additional wedging elements and respective recesses could be provided diametrically opposite the wedging elements shown in FIGS. 21 and 22 to spread the transmitted loads more evenly about the wrench head 416.

In the illustrated examples the force applying member(s) ensure that the wedging elements move substantially simultaneously into a drive transmitting position. This results in an even force distribution of the torque transmitted to the driven member and reduces the likelihood of damage to parts of the wrench head due to stress concentrations resulting from one or more wedging elements not bearing its share of the load.

In a conventional ratchet wrench, the torque is transmitted from the wrench head to the driven member via a pawl. The area of contact between the pawl and the driven member is usually relatively small. It has been found that in some better known ratchet wrenches, there may be engagement between the pawl and driven member over approximately 31° of the periphery of the driven member. In the illustrated examples employing six simultaneously engaging wedging elements it has been possible to obtain engagement with approximately 132° of the periphery of the driven member. This reduces the stress concentration for any given load as compared with a conventional ratchet wrench. The reduced stress concentrations found in the illustrated examples should result in a reduced likelihood of damage to the wrench in use, particularly in high load operations. It also allows the components such as the wrench head and driven member to be relatively thinner in the radial direction than a corresponding sized conventional ratchet wrench so that the overall size of the wrench head can be reduced when compared with conventional ratchet wrenches.

In order for a ratcheting wrench to function, the object that is being operated on by the wrench must provide sufficient resistance to movement to hold the driven member during repositioning movements of the wrench head. As compared with conventional ratchet wrench heads that have a spring biased pawl in permanent engagement with the driven member during repositioning movements, the wrench heads of the illustrated examples require a markedly lower resistance force. An initial resistance force is needed in order to overcome the friction between the wedging elements and the driven member and wrench head. However, this will typically be much lower than that needed to overcome the spring bias acting on a pawl in a conventional ratchet wrench and once the wedging elements are no longer in engagement with the wrench head, little or no resistance is needed.

The force applying member(s) in the illustrated examples function to apply a circumferentially directed force to the wedging elements to move them from a non-drive transmitting position to a drive transmitting position. The force applying members do not function to transfer a torque from the wrench head to the driven member. This is achieved by providing a clearance between the inner periphery of the force applying member(s) and oppositely disposed portions of the driven member and wedging elements. Since the force applying members have only to apply the relatively low force needed to move the wedging elements and are not required to transmit the torque between the head and driven member, they do not have to be structurally strong. Accordingly, the force applying member(s) can be of relatively light and slender construction. This has advantages in terms of keeping the overall size of the wrench head as small as possible and keeping the weight of the wrench as low as possible.

The illustrated examples have been described as being used to apply a torque to a fastener head or a nut. It will be understood that the illustrated wrench heads are not limited to such applications. By providing a suitably shaped hole, which may be a blind hole or a through hole, in the driven member or affixing a suitable attachment where the driven member is provided with a drive spigot (such as the drive spigot 336 of the wrench 310) the wrench heads can be utilised to apply a torque to a wide variety of parts. For example, a suitably shaped hole might be provided in the driven member to engage an end of a shaft provided with splines or other formations.

In the illustrated examples the wedging elements are shown provided with teeth are engagable with teeth provided on an opposing member when the wedging elements are driven outwardly from their respective recesses into engagement with that member. For example in the wrench heads shown in FIGS. 2 and 10, the wedging elements are shown having teeth that engage teeth on a wall of a chamber in which the driven member is housed. In the examples illustrated in FIGS. 14 and 21, the wedging elements are shown having teeth that engage teeth provided on a sidewall of the driven member. In each case, the teeth are not essential and the respective engaging surfaces may be generally smooth and free of engaging formations.

In the description reference is made to clockwise and anti-clockwise movements. This refers only to the directions as seen in the relevant drawings and is not to be taken as limiting.

In the context of this application, a wrench ratchet mechanism and a ratchet wrench head are devices able to apply a torque in one direction and allow repositioning of the wrench head relative to an object to which a torque is being applied while the wrench head, or a socket or the like attached to the wrench head, remains engaged with the object.

The invention clamed is:

1. A wrench ratchet mechanism comprising:
a driven member;
a housing defining a chamber in which said driven member is at least partially received;
a plurality of drive transmitting members disposed in respective recesses between said driven member and housing to transmit a drive force between said housing and driven member; and
a force applying member extending at least partially around said driven member and movable in a circumferential direction thereof to apply a circumferentially directed force to said drive transmitting members to move said drive transmitting members in said recesses from a non-drive transmitting position towards a drive transmitting position, wherein said drive transmitting members are wedging elements that wedge between said housing and driven member when in said drive transmitting position;

said wedging elements each have a first side and a second side and in said circumferential direction increase in thickness between said first and second sides; and said force applying member comprises respective first engagement members engageable with the respective first sides of said wedging elements to apply said circumferentially directed force to said wedging elements.

2. A wrench ratchet mechanism as claimed in claim 1, wherein said recesses are each at least partially defined by at least a first radially facing wall engageable by a major surface of the respective wedging elements to cause a radial component of movement of said wedging elements when said wedging elements move from said non-drive transmitting position towards said drive transmitting position.

3. A wrench ratchet mechanism as claimed in claim 2, wherein said recesses are each at least partially defined by a second radially facing wall that is engaged by a second major surface of the respective wedging elements, said first radially facing wall causing said radial component of movement when said wedging elements move from said non-drive transmitting position towards said transmitting position in a clockwise direction and said second radially facing wall being configured to cause a radial component of movement of said wedging elements when said wedging elements move from said non-drive transmitting position towards said drive transmitting position in an anticlockwise direction.

4. A wrench ratchet mechanism as claimed in claim 3, wherein said recesses have a V-shaped cross-section.

5. A wrench ratchet mechanism as claimed in claim 2, wherein said first radially facing wall is disposed such that in said circumferential direction said recesses have a depth that varies between a deeper first end region and a shallower second end region and when moving from said non-drive transmitting position to said drive transmitting position said wedging elements move in a direction away from said first end region towards said second end region.

6. A wrench ratchet mechanism as claimed in claim 2, wherein one of said driven member and said housing comprises a wall provided with a plurality of first teeth disposed in series in said circumferential direction and said wedging elements are provided with second teeth to engage with said first teeth when said members wedging elements are in said drive transmitting position.

7. A wrench ratchet mechanism as claimed in claim 6, wherein said first radially facing walls and major surfaces are arranged such that all of said second teeth engage said first teeth simultaneously when said wedging elements move into said drive transmitting position.

8. A wrench ratchet mechanism as claimed in claim 2, wherein said radial component of movement is radially outwardly of said driven member and said force applying member extends about said driven member and said drive transmitting members.

9. A wrench ratchet mechanism as claimed in claim 2, wherein said radial component of movement is radially inwardly of said driven member, said force applying member extends about said driven member and said wedging elements are disposed about said force applying member.

10. A wrench ratchet mechanism as claimed in claim 1, wherein when in said non-drive transmitting position said wedging elements are housed completely within said recesses and when in said drive transmitting position said wedging elements project partially from said recesses.

11. A wrench ratchet mechanism as claimed in claim 1, wherein said force applying member comprises a split ring member.

12. A wrench ratchet mechanism as claimed in claim 1, wherein said force applying member comprises respective second engagement members engageable with the respective second sides of said wedging elements to move said wedging elements away from said drive transmitting position.

13. A wrench ratchet mechanism as claimed in claim 1, wherein each said engagement member comprises a projection extending radially from said force applying member.

14. A wrench ratchet mechanism as claimed in claim 1, wherein said force applying member is partially received in said housing and partially received in said driven member so as to secure said driven member in said chamber.

15. A wrench ratchet mechanism as claimed in claim 14, wherein said force applying member engages in at least one groove provided in said housing and at least one groove provided in said driven member.

16. A wrench ratchet mechanism as claimed in claim 14, wherein said force applying member is partially received in respective grooves in said wedging elements to secure said wedging elements to one of said housing and said driven member.

17. A wrench ratchet mechanism as claimed in claim 13, wherein said driven member has an axis of rotation, said chamber has a height parallel to said axis of rotation and said force applying member is disposed within a 75 percent midrange of said height that is centered on mid-height.

18. A wrench ratchet mechanism as claimed in claim 1, wherein said force applying member engages said housing such that rotation of said housing by said circumferentially directed force is transmitted to said force applying member.

19. A wrench ratchet mechanism as claimed in claim 18, wherein said force applying member is a resilient member that resiliently engages said housing to transmit said circumferentially directed force.

20. A wrench ratchet mechanism as claimed in claim 1, further comprising a switch movable to move said force applying member in said circumferential direction to apply said circumferentially directed force to said wedging elements.

21. A wrench ratchet mechanism as claimed in claim 20, wherein said switch comprises a plurality of arms engagable with formations provided on an outer periphery of said force applying member.

22. A wrench ratchet mechanism as claimed in claim 20, wherein said switch comprises respective engagement surfaces for engaging respective end pieces of said force applying member to provide a pulling force on said end pieces to pull said force applying member circumferentially about said driven member.

23. A wrench ratchet mechanism as claimed in claim 22, comprising a first said force applying member having at least one first said wedging element associated therewith and a second said force applying member having at least one second said wedging element associated therewith, said switch being movable in a first direction to move said first force applying member in a first said circumferential direction to move said at least one first wedging element to said drive transmitting position thereof and movable in a second direction to move said second force applying member in a second said circumferential direction to move said at least one second wedging element to said drive transmitting position thereof.

24. A wrench ratchet mechanism comprising:
a driven member;
a housing defining a chamber in which said driven member is at least partially received;
a plurality of drive transmitting members disposed in respective recesses between said driven member and housing to transmit a drive force between said housing and driven member; and
a force applying member extending at least partially around said driven member and movable in a circumferential direction of said driven member to apply a force to said drive transmitting members to move said drive transmitting members in said recesses from a non-drive transmitting position towards a drive transmitting position, wherein said driven member has an axis of rotation, said chamber has a height parallel to said axis of rotation and said force applying member is disposed within a 75 percent midrange of said height that is centered on mid-height; and
wherein said force applying member engages in grooves provided in said driven member, housing and said drive transmitting members to secure said driven member and drive transmitting members to said housing.

25. A wrench ratchet mechanism comprising:
a driven member;
a housing defining a chamber in which said driven member is at least partially received,
at least one drive transmitting member disposed in a recess between said driven member and housing and moveable in said recess from a non-drive transmitting position to a drive transmitting position to transmit a drive force between said housing and driven member; and
a split ring securing said driven member in said chamber, wherein said driven member has an axis of rotation,
said housing has a height parallel to said axis of rotation,
said split ring is disposed in a 50 percent midrange of said height centered on mid-height, and
wherein said split ring has a respective projection to engage said at least one drive transmitting member to apply a drive force to said at least one drive transmitting member to move said at least one drive transmitting member from said non-drive transmitting position to said drive transmitting position.

26. A sub-assembly for a wrench ratchet mechanism comprising:
a driven member to output a torque from said wrench ratchet mechanism;
a plurality of wedging elements that each have a first side and a second side; and
a split ring force applying member provided with respective first engagement members projecting from said split ring to engage said first sides of said wedging elements to apply a moving force to said wedging elements,
wherein said driven member has a circumference,
wherein said wedging elements are housed in respective recesses defined by said driven member,
wherein said force applying member extends about said driven member and wedging and is engaged in grooves provided in said driven member and wedging elements to secure said wedging elements in said recesses, and
wherein said force applying member is movable about said driven member in a first direction about said circumference to apply said moving force to said wedging elements to move said wedging elements along said recesses in said first direction from a non-drive transmitting position to a drive transmitting position.

27. A sub-assembly as claimed in claim 26, wherein said driven member has a rotational axis and said force applying member has a radially facing inner peripheral surface that is disposed radially further from said rotational axis than respective inner faces of said grooves.

28. A sub-assembly as claimed in claim 26, wherein said force applying member comprises respective second engagement members projecting from said split ring to engage said second sides of said wedging elements when said force applying member is moved in a second direction about said circumference of said driven member to move said wedging elements from said drive transmitting member to said non-drive transmitting position.

* * * * *